(12) United States Patent
Ewell, Jr. et al.

(10) Patent No.: US 9,026,780 B2
(45) Date of Patent: *May 5, 2015

(54) MOBILE COMMUNICATOR DEVICE INCLUDING USER ATTENTIVENESS DETECTOR

(71) Applicant: Mobile Communication Technologies, LLC, Houston, TX (US)

(72) Inventors: Robert C. Ewell, Jr., Ballston Spa, NY (US); Douglas L. Garmany, Pineland, TX (US); Charles T. Kelly, Houston, TX (US)

(73) Assignee: Mobile Communication Technologies, LLC, Houston, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/914,007

(22) Filed: Jun. 10, 2013

(65) Prior Publication Data

US 2014/0045477 A1 Feb. 13, 2014

Related U.S. Application Data

(63) Continuation-in-part of application No. 13/084,732, filed on Apr. 12, 2011.

(51) Int. Cl.
*G06F 1/24* (2006.01)
*G06F 9/00* (2006.01)
(Continued)

(52) U.S. Cl.
CPC .............. *H04W 4/027* (2013.01); *H04W 4/026* (2013.01); *G06F 1/1626* (2013.01); *G06F 1/1694* (2013.01); *G06F 3/012* (2013.01); *G06F 3/013* (2013.01); *H04M 1/72577* (2013.01)

(58) Field of Classification Search
USPC .......... 713/100, 300, 310, 320; 455/410, 411, 455/466
See application file for complete search history.

(56) References Cited

U.S. PATENT DOCUMENTS

| 5,844,544 A | 12/1998 | Kahn et al. |
| 5,886,683 A | 3/1999 | Tognazzini et al. |

(Continued)

FOREIGN PATENT DOCUMENTS

JP    2005303384    10/2005

OTHER PUBLICATIONS

International Search Report; PCT/US2012/33181; International File Date: Apr. 12, 2012; Mobile Communication Technologies, LLC; 20 pages.

(Continued)

*Primary Examiner* — Zahid Choudhury
(74) *Attorney, Agent, or Firm* — Schmeiser, Olsen & Watts, LLP

(57) ABSTRACT

Disclosed herein is a mobile communicator that includes a speed detection system for determining whether the mobile communicator is moving faster than a threshold speed. The mobile communicator further includes a user attentiveness detector configured to determine whether a user is inattentive and a sensor element configured to determine orientation of the mobile communicator. The mobile communicator further includes a circuit configured to ensure that a functionality of the mobile communicator is in a turned off state when the speed detection system determines that the mobile communicator is moving faster than the threshold speed and at least one of: (a) the user attentiveness detector determines that the user is inattentive; and (b) the sensor element determines that the mobile communicator is in a substantially vertical position.

21 Claims, 14 Drawing Sheets

(51) Int. Cl.
  *H04W 4/02* (2009.01)
  *G06F 1/16* (2006.01)
  *G06F 3/01* (2006.01)
  *H04M 1/725* (2006.01)

(56) References Cited

U.S. PATENT DOCUMENTS

| | | |
|---|---|---|
| 5,892,447 A | 4/1999 | Wilkinson |
| 6,108,532 A | 8/2000 | Matsuda et al. |
| 6,115,607 A | 9/2000 | Holcman |
| 6,282,553 B1 | 8/2001 | Flickner et al. |
| 6,377,813 B1 | 4/2002 | Kansakoski et al. |
| 6,496,703 B1 | 12/2002 | Da Silva |
| 6,556,810 B2 | 4/2003 | Suzuki |
| 6,633,762 B1 | 10/2003 | Brown et al. |
| 6,633,950 B1 | 10/2003 | Brown et al. |
| 6,636,732 B1 | 10/2003 | Boling et al. |
| 6,662,023 B1 | 12/2003 | Helle |
| 6,687,497 B1 | 2/2004 | Parvulescu et al. |
| 6,690,940 B1 | 2/2004 | Brown et al. |
| 6,694,143 B1 | 2/2004 | Beamish et al. |
| 6,771,946 B1 | 8/2004 | Oyaski |
| 6,782,240 B1 | 8/2004 | Tabe |
| 6,823,199 B2 | 11/2004 | Gough |
| 6,871,063 B1 | 3/2005 | Schiffer |
| 6,934,547 B2 | 8/2005 | Suzuki |
| 6,967,580 B1 | 11/2005 | Schulze |
| 6,973,333 B1 | 12/2005 | O'Neil |
| 7,065,349 B2 | 6/2006 | Nath et al. |
| 7,088,225 B2 | 8/2006 | Yoshioka |
| 7,113,170 B2 | 9/2006 | Lauper et al. |
| 7,123,874 B1 | 10/2006 | Brennan |
| 7,187,953 B2 | 3/2007 | Bauchot et al. |
| 7,260,390 B1 | 8/2007 | Skinner et al. |
| 7,308,247 B2 | 12/2007 | Thompson et al. |
| 7,343,148 B1 | 3/2008 | O'Neil |
| 7,505,784 B2 | 3/2009 | Barbera |
| 7,590,405 B2 | 9/2009 | Ewell, Jr. |
| 7,719,520 B2 | 5/2010 | Singh et al. |
| 7,762,665 B2 | 7/2010 | Vertegaal et al. |
| 8,131,848 B1 | 3/2012 | Denise |
| 8,380,161 B2 | 2/2013 | Ewell, Jr. et al. |
| 8,385,880 B2 | 2/2013 | Ewell, Jr. et al. |
| 8,417,268 B1 | 4/2013 | Halferty et al. |
| 8,538,158 B1 | 9/2013 | Denise |
| 2001/0051514 A1 | 12/2001 | Lindholm |
| 2002/0090919 A1 | 7/2002 | Hofman |
| 2002/0128000 A1 | 9/2002 | do Nascimento, Jr. |
| 2002/0164979 A1 | 11/2002 | Mooney et al. |
| 2002/0173301 A1 | 11/2002 | Ikeda |
| 2002/0193107 A1 | 12/2002 | Nascimento, Jr. |
| 2002/0198005 A1 | 12/2002 | Hilton et al. |
| 2003/0045322 A1 | 3/2003 | Baer et al. |
| 2003/0050039 A1 | 3/2003 | Baba et al. |
| 2003/0171133 A1 | 9/2003 | Mizuta et al. |
| 2004/0077339 A1 | 4/2004 | Martens |
| 2004/0110421 A1 | 6/2004 | Takamura et al. |
| 2004/0171407 A1 | 9/2004 | Ninomiya |
| 2004/0176083 A1 | 9/2004 | Shiao et al. |
| 2004/0198306 A1 | 10/2004 | Singh et al. |
| 2004/0201520 A1 | 10/2004 | Flick |
| 2004/0203554 A1 | 10/2004 | Simon |
| 2004/0204003 A1 | 10/2004 | Soerensen et al. |
| 2004/0204021 A1 | 10/2004 | Cocita |
| 2004/0229645 A1 | 11/2004 | Montgomery |
| 2005/0026644 A1 | 2/2005 | Lien |
| 2005/0239479 A1 | 10/2005 | Bednasz |
| 2005/0255874 A1 | 11/2005 | Stewart-Baxter et al. |
| 2006/0003809 A1 | 1/2006 | Boling et al. |
| 2006/0066567 A1 | 3/2006 | Scharenbroch et al. |
| 2006/0099940 A1 | 5/2006 | Pfleging et al. |
| 2006/0148490 A1 | 7/2006 | Bates et al. |
| 2006/0240860 A1 | 10/2006 | Benco et al. |
| 2006/0258376 A1 | 11/2006 | Ewell, Jr. |
| 2007/0024579 A1 | 2/2007 | Rosenberg |
| 2007/0072553 A1 | 3/2007 | Barbera |
| 2007/0078552 A1 | 4/2007 | Rosenberg |
| 2007/0111756 A1 | 5/2007 | Reed |
| 2007/0164990 A1 | 7/2007 | Bjorklund et al. |
| 2007/0213092 A1 | 9/2007 | Geelen |
| 2007/0270122 A1 | 11/2007 | Ewell, Jr. |
| 2008/0075056 A1 | 3/2008 | Thome |
| 2008/0169914 A1 | 7/2008 | Albertson et al. |
| 2008/0200166 A1* | 8/2008 | McCamon ............... 455/426.1 |
| 2008/0299900 A1 | 12/2008 | Lesyna |
| 2008/0299954 A1 | 12/2008 | Wright et al. |
| 2008/0305735 A1 | 12/2008 | Farnsworth et al. |
| 2008/0316181 A1 | 12/2008 | Nurmi |
| 2009/0029675 A1 | 1/2009 | Steinmetz et al. |
| 2009/0055896 A1 | 2/2009 | Aoki et al. |
| 2009/0117919 A1 | 5/2009 | Hershenson |
| 2009/0163243 A1 | 6/2009 | Barbera |
| 2009/0215466 A1 | 8/2009 | Ahl et al. |
| 2009/0253423 A1 | 10/2009 | Kullberg |
| 2009/0258676 A1 | 10/2009 | Tanaka |
| 2009/0270143 A1 | 10/2009 | Bury |
| 2009/0282127 A1 | 11/2009 | Leblanc et al. |
| 2009/0295562 A1 | 12/2009 | Shuster |
| 2010/0009658 A1 | 1/2010 | Wu et al. |
| 2010/0042911 A1 | 2/2010 | Wormald et al. |
| 2010/0088047 A1 | 4/2010 | Campbell et al. |
| 2010/0093405 A1 | 4/2010 | Ewell, Jr. |
| 2010/0113073 A1* | 5/2010 | Schlesener et al. ........... 455/466 |
| 2010/0130170 A1 | 5/2010 | Liu et al. |
| 2010/0132040 A1 | 5/2010 | Bhagwat et al. |
| 2010/0156781 A1 | 6/2010 | Fahn |
| 2010/0182243 A1 | 7/2010 | Singh et al. |
| 2010/0197351 A1 | 8/2010 | Ewell, Jr. |
| 2010/0207721 A1 | 8/2010 | Nakajima et al. |
| 2010/0216509 A1 | 8/2010 | Riemer et al. |
| 2010/0229217 A1 | 9/2010 | Bhatia |
| 2010/0248642 A1 | 9/2010 | Howard et al. |
| 2010/0304712 A1 | 12/2010 | Sweeney et al. |
| 2010/0323657 A1 | 12/2010 | Barnard et al. |
| 2011/0009107 A1 | 1/2011 | Guba et al. |
| 2011/0028139 A1 | 2/2011 | Odom |
| 2011/0065456 A1 | 3/2011 | Brennan et al. |
| 2011/0082790 A1 | 4/2011 | Baker et al. |
| 2011/0235443 A1 | 9/2011 | Lee et al. |
| 2011/0244824 A1 | 10/2011 | Ewell, Jr. |
| 2011/0298924 A1 | 12/2011 | Miller et al. |
| 2012/0021717 A1 | 1/2012 | Schmidt |
| 2012/0129544 A1 | 5/2012 | Hodis et al. |
| 2012/0129545 A1 | 5/2012 | Hodis et al. |
| 2012/0158918 A1 | 6/2012 | Leblanc et al. |
| 2012/0166788 A1 | 6/2012 | Racha et al. |
| 2012/0206254 A1 | 8/2012 | Morris |
| 2012/0214463 A1 | 8/2012 | Smith et al. |
| 2012/0231773 A1 | 9/2012 | Lipovski |
| 2012/0244883 A1 | 9/2012 | Tibbitts et al. |
| 2012/0265977 A1 | 10/2012 | Ewell, Jr. |
| 2012/0289217 A1 | 11/2012 | Riemer et al. |
| 2012/0309296 A1 | 12/2012 | Tieman et al. |
| 2012/0327225 A1* | 12/2012 | Barley et al. .................. 348/143 |
| 2013/0035117 A1 | 2/2013 | Litkouhi et al. |
| 2013/0052945 A1 | 2/2013 | Ewell, Jr. et al. |
| 2013/0150004 A1 | 6/2013 | Rosen |
| 2013/0252575 A1 | 9/2013 | Ewell, Jr. et al. |
| 2013/0303143 A1* | 11/2013 | Schrader et al. ............. 455/418 |
| 2014/0004840 A1 | 1/2014 | Ewell, Jr. et al. |
| 2014/0118597 A1* | 5/2014 | Tabak et al. .............. 348/333.02 |

OTHER PUBLICATIONS

Office Action (mail date Oct. 16, 2013) for U.S. Appl. No. 13/084,732, filed Apr. 12, 2011.
Office Action (mail date Apr. 15, 2014) for U.S. Appl. No. 13/084,732, filed Apr. 12, 2011.
Office Action (mail date Jun. 3, 2014) for U.S. Appl. No. 13/834,744, filed Mar. 15, 2013.

* cited by examiner

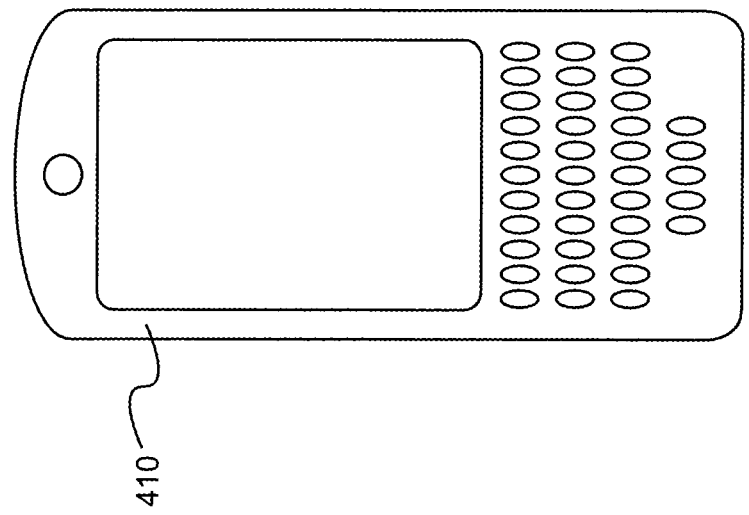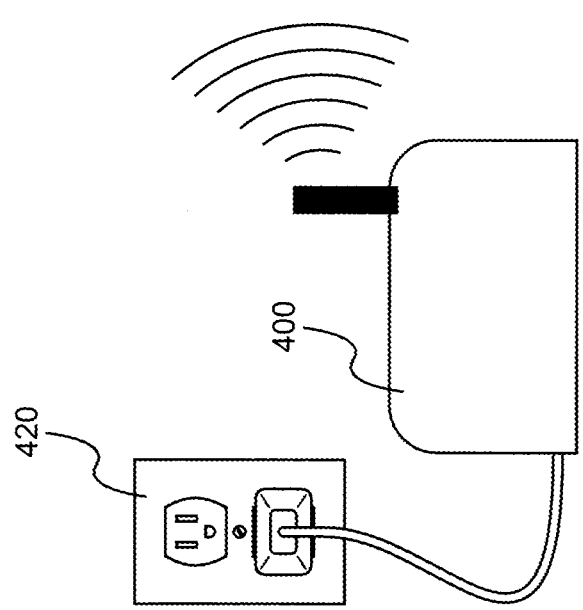
Fig. 8

MOBILE COMMUNICATOR DEVICE INCLUDING USER ATTENTIVENESS DETECTOR

RELATED APPLICATION

This application is a continuation-in-part of and claims priority from co-pending U.S. patent application Ser. No. 13/084,732 filed Apr. 12, 2011 and entitled "Mobile Communicator Device Including User Attentiveness Detector," which is incorporated herein by reference in its entirety.

FIELD OF TECHNOLOGY

The subject matter disclosed herein relates generally to mobile communicators. More particularly, the subject matter relates to a mobile communicator having a user attentiveness detector that determines a user's attentiveness toward the mobile communicator, and a sensor element that determines the orientation of the mobile communicator, and a system and software for implementing such a mobile communicator.

BACKGROUND

Mobile communicators such as but not limited to cell phones, BLACKBERRIES®, IPHONES®, IPADS®, tablets, netbooks, laptop computers, notepads, GPS devices, personal digital assistants (PDA) and the like are becoming increasingly utilized in today's society. However, these devices may also become an undesirable distraction in many situations. For example, many people choose to use their mobile communicators while driving. Text messaging, web surfing, and emailing functions may be particularly undesirable when driving because a person must constantly utilize at least one hand to input these types of communications, and must often look down to draft a text message. Studies have been undergone which show that this behavior significantly increases the likelihood of causing a traffic accident. Yet, people continue to text message with their mobile communicators while driving with increasing regularity. In light of this, many states are attempting to pass legislation aimed at making it illegal to text while driving. However, governmentally regulated penalties alone may not be a sufficient enough deterrent to cause people to drastically change their behavior.

Thus, a mobile communicator having a user attentiveness detector that determines a user's attentiveness toward the mobile communicator and also determines its own orientation, and a system and software for implementing such a mobile communicator would be well received in the art.

BRIEF DESCRIPTION

According to one embodiment, a mobile communicator comprises: a speed detection system for determining whether the mobile communicator is moving faster than a threshold speed; a user attentiveness detector configured to determine whether a user is inattentive; a sensor element configured to determine orientation of the mobile communicator; and a circuit configured to ensure that a functionality of the mobile communicator is in a turned off state when the speed detection system determines that the mobile communicator is moving faster than the threshold speed and at least one of: the user attentiveness detector determines that the user is inattentive; and the sensor element determines that the mobile communicator is in a substantially vertical position.

According to another embodiment, a mobile communicator comprises: a default turned off state wherein at least one restricted functionality is in a turned off state unless at least one condition has been met; a speed detection system for determining whether the mobile communicator is moving slower than a threshold speed; a user attentiveness detector configured determine whether a user is attentive; a sensor element configured to determine the orientation of the mobile communicator; and a circuit configured to enable the at least one restricted functionality of the mobile communicator when the speed detection system determines that the mobile communicator is moving slower than the threshold speed and the user attentiveness detector determines that the user is attentive and the sensor element determines that the mobile communicator is in a substantially horizontal position.

According to another embodiment, a computer program product, comprises a non-transitory computer-readable storage medium having a computer-readable program code stored therein, said computer-readable program code containing instructions configured to be executed by a processor of a mobile communicator to implement a method of restricting the functionality of the mobile communicator, the method comprises: the processor determining whether the mobile communicator is moving faster than a threshold speed; the processor determining whether a user is inattentive; the processor determining whether the mobile communicator is in a vertical position and the processor disabling a functionality of the mobile communicator if the mobile communicator is moving faster than the threshold speed and at least one of: the user is inattentive; and the mobile communicator is in a substantially vertical orientation.

According to another embodiment, a computer system comprises: a processor; and a computer-readable memory unit coupled to the processor, the memory unit containing instructions that when executed by the processor implement a method of restricting the functionality of the computer system, the method comprises: determining whether the mobile communicator is moving faster than a threshold speed; determining whether a user is inattentive; determining whether the mobile communicator is in a vertical position; and disabling a functionality of the mobile communicator if the mobile communicator is moving faster than the threshold speed and at least one of: the user is inattentive; and the mobile communicator is in a substantially vertical orientation.

BRIEF DESCRIPTION OF THE DRAWINGS

The subject matter which is regarded as the invention is particularly pointed out and distinctly claimed in the claims at the conclusion of the specification. The foregoing and other features and advantages of the invention are apparent from the following detailed description taken in conjunction with the accompanying drawings in which:

FIG. 8 depicts a kit and a mobile communicator according to one embodiment;

DETAILED DESCRIPTION

A detailed description of the hereinafter described embodiments of the disclosed apparatus and method are presented herein by way of exemplification and not limitation with reference to the Figures.

Figure 1:
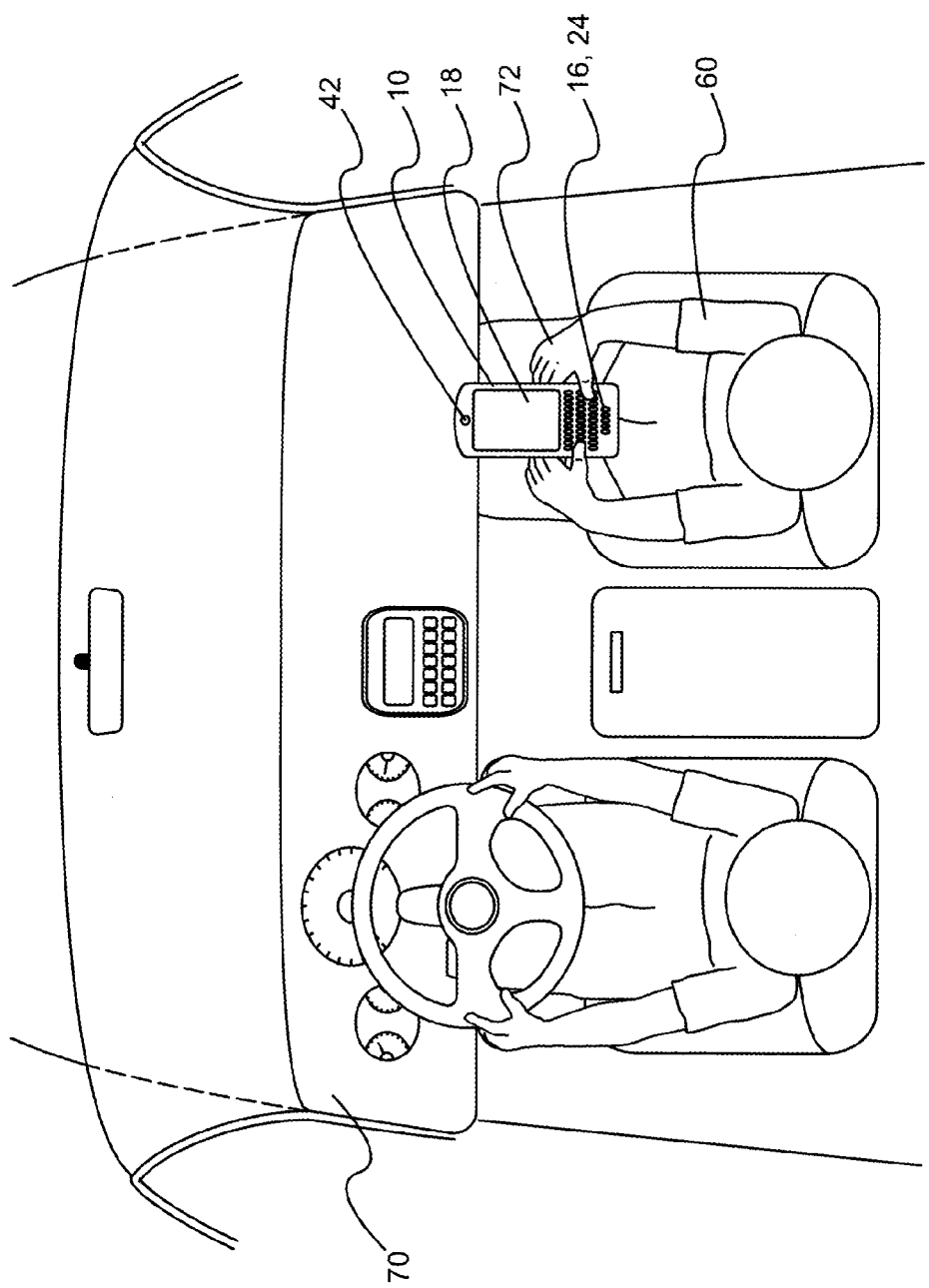
FIG. 1 depicts a mobile communicator according to one embodiment.
Figure 2:
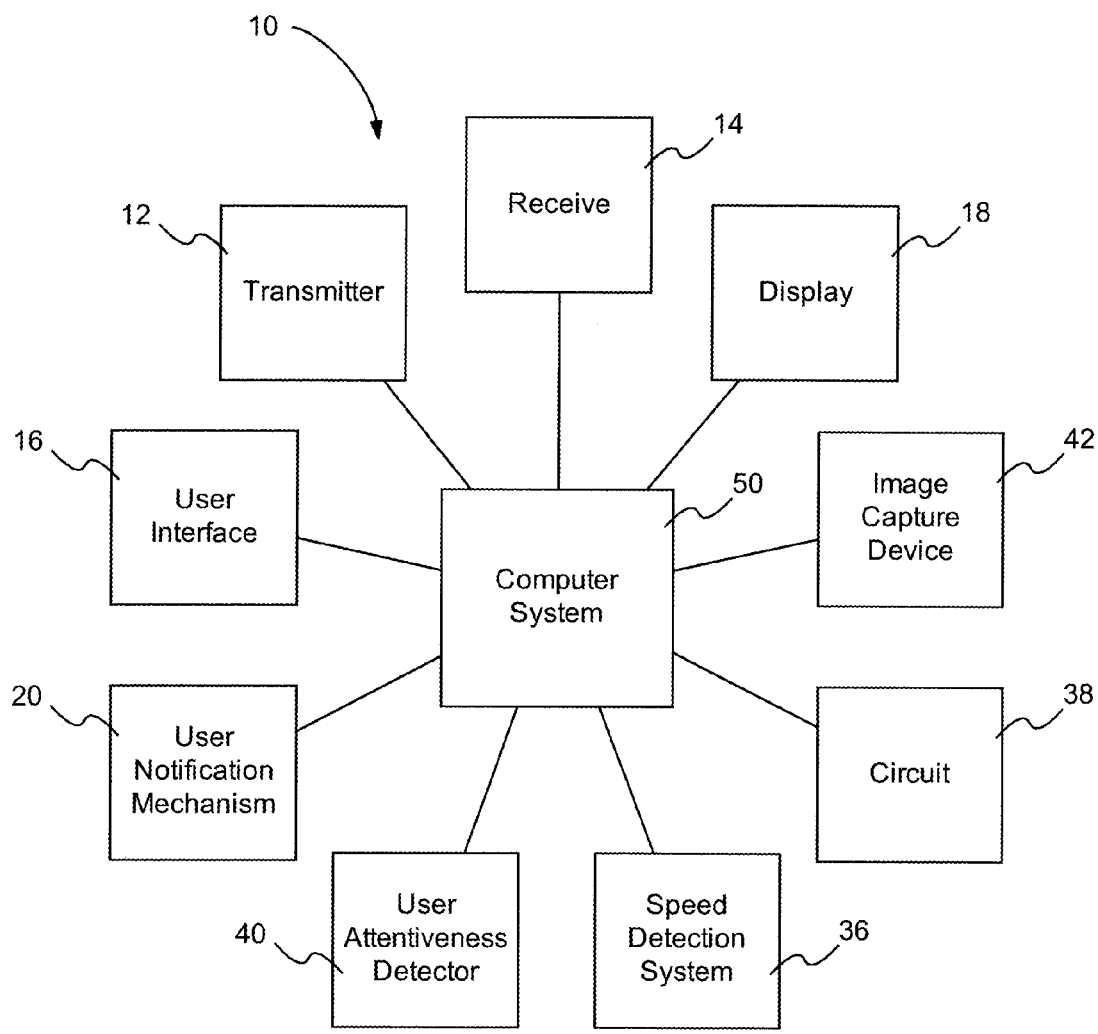
FIG. 2 depicts a schematic view of the mobile communicator of FIG. 1 according to one embodiment.

Referring to FIGS. 1-2, a mobile communicator 10 is shown in both a perspective view and schematically. The mobile communicator 10 may be a cell phone such as an IPHONE®, ANDROID® or BLACKBERRY®. However, in other embodiments the mobile communicator may be a PDA, a net book, a laptop, a GPS device, a walkie-talkie, an IPAD® or any other communicative device. The mobile communicator 10 may include at least one transmitter 12, at least one receiver 14, at least one user interface 16, at least one display 18, and at least one user notification mechanism 20. The mobile communicator 10 may also include various functions including but not limited to a text messaging interface, an image messaging interface, a video messaging interface, an internet browser, an image capturer, a voice capturer, a video capturer, a GPS graphical map viewer, a game player, a digital music player, an alarm clock, a digital memo pad, a digital calendar, a two-way radio, an e-book reader, an electronic contact rolodex, a calculator, an application download interface, and any other application that is available to provide further functionalities. It should be understood that this list is not exhaustive and that the mobile communicator 10 may further include any other functionality that is known to those skilled in the art. The mobile communicator 10 is shown in FIG. 1 to be held by a user 60 that is riding as a passenger in an automobile 70. Furthermore, it should be understood that the user 60 may not necessarily be holding the mobile communicator 10. The mobile communicator 10 may be a pad, or some other mounted device that is mounted onto the automobile 70, or another vehicle or structure.

Figure 3:
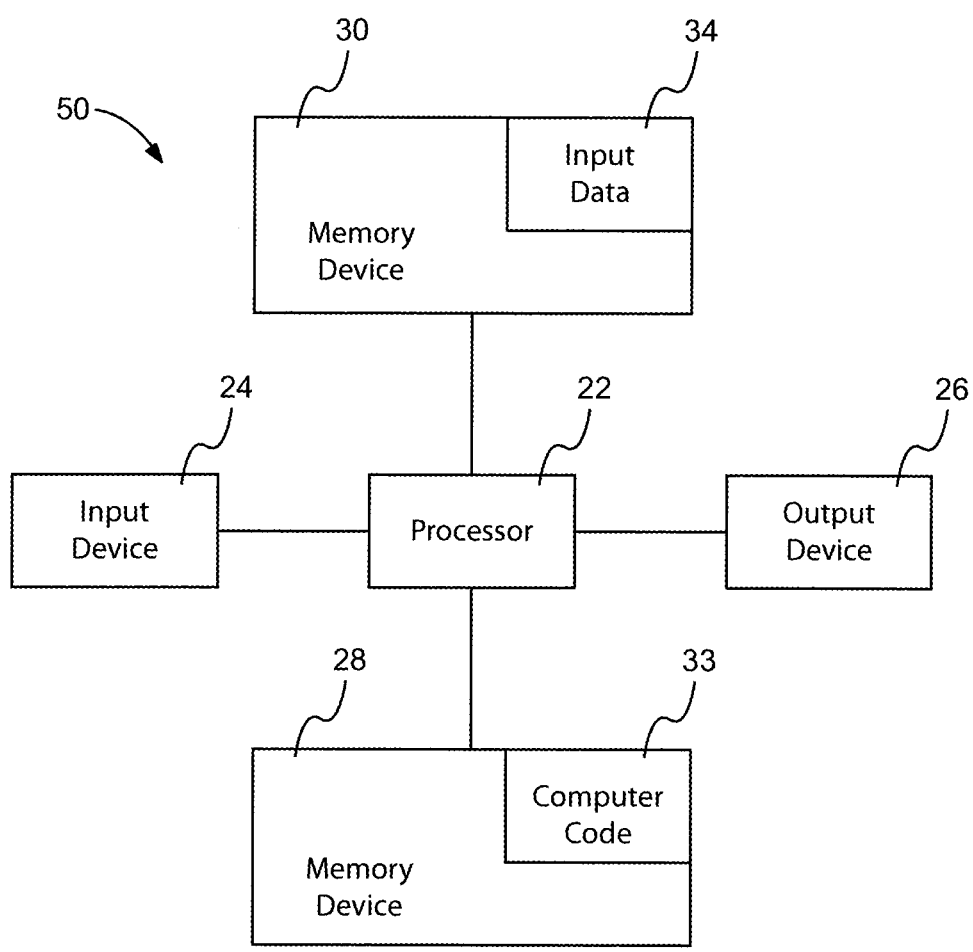
FIG. 3 depicts a schematic view of an embodiment of a computer system of the mobile communicator of FIGS. 1-2.

FIG. 3 illustrates a computer system 50 of the mobile communicator 10 (examples of which may be various embodiments of described hereinbelow) usable for communication and various other applications. The computer system 50 of the mobile communicator 10 may further comprise a processor 22, an input device 24, such as the user interface 16 and the receiver 14, coupled to the processor 22, an output device 26, such as the transmitter 12, coupled to the processor 22, and memory devices 28 and 30 each coupled to the processor 22. The memory devices 28 and 30 may be, among other things, a hard disk, a floppy disk, a magnetic tape, an optical storage such as a compact disc (CD) or a digital video disc (DVD), a dynamic random access memory (DRAM), a read-only memory (ROM), etc. The memory device 28 may include a computer code 32. The computer code 32 includes algorithms or a predetermined set of parameters for performing a process for monitoring a communication system. The processor 22 may execute the computer code 32. The memory device 30 may include input data 34. The input data 34 includes input required by the computer code 32. The output device 26 displays output from the computer code 32. Either or both memory devices 28 and 30 (or one or more additional memory devices not shown in FIG. 2) may comprise the algorithm or predetermined parameters and may be used as a computer usable medium (or a computer readable medium or a program storage device) having a computer readable program code embodied therein and/or having other data stored therein, wherein the computer readable program code comprises the computer code 32. Generally, a computer program product (or, alternatively, an article of manufacture) of the mobile computer 10 may comprise said computer usable medium (or said program storage device).

While FIG. 3 shows the computer system 50 of the mobile communicator 10 as a particular configuration of hardware and software, any configuration of hardware and software, as would be known to a person of ordinary skill in the art, may be utilized for the purposes stated herein in conjunction with the particular mobile communicator 10 of FIG. 2. For example, the memory devices 28 and 30 may be portions of a single memory device rather than separate memory devices.

It should be noted that the embodiments described hereinbelow illustrate the architecture, functionality, and operation of possible implementations of systems, methods and computer program products according to various described and depicted embodiments. In this regard, each block in the block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagram illustrations, can be implemented by special purpose hardware-based systems that perform the specified functions or acts, or combinations of special purpose hardware and computer instructions.

Referring back to FIGS. 1-2, the display 18 of the mobile communicator 10 may be a complex interactive touch-screen that is integrated with the user interface 16. Thus, it should be understood that the display 18 may also be the user interface 16. Alternately, the display 18 may be a simple LCD display for presenting information to the user 60 such as a calling number or the number dialed. It should be understood any form of display is contemplated. It should further be understood that the mobile communicator 10 may include a plurality of displays 18.

Likewise, the user notification mechanism 20 of the mobile communicator 10 may be a noise notification element, such as a speaker that emits a ring or "ring-tone" that alerts the user 60. For example, when the mobile communicator 10 receives a transmission signal, a speaker may emit a pre-programmed audible ring that alerts the user 60 of the incoming transmission. Alternately, the notification mechanism 20 may be a change found on the display 18. For example, the display 18 may light up when a transmission is incoming. Still further, the mobile communicator 10 may vibrate, as is known in the art. The user notification mechanism 20 may be any mechanism for alerting the user 60 of a communication event. Additionally, the notification mechanism 20 may be preprogrammed to alert the user 60 of a predetermined event, such as when a time of day is reached (in the case of an alarm clock notification). It should further be understood that the mobile communicator 10 may include a plurality of user notification mechanisms 20.

The user interface 16 may be configured for allowing the user 60 to enter a plurality of identity inputs associated with an alphanumeric combination of numbers and letters. For example, the user interface 16 may be a touch screen, a keyboard, or a simple number pad. Alternately, the user interface 16 may be a voice receiver that allows the user 60 to enter a plurality of identity inputs by voice. In one embodiment, the user interface 16 may be a text messaging interface. The user interface may thus be configured for web browsing and video watching. The text messaging interface may be a telephone text messaging interface, or another "chat" functionality such as email, Google Talk®, AIM®, Skype®, Facebook®, Myspace®, Twitter® or any other communication application that allows the user 60 to communicate via text-based messages. In other embodiments, the user interface 16 is a telephone number dialing interface. It should therefore be understood that the mobile communicator 10 may include any type of user interface 16 that would be apparent to those skilled in the art such as a voice input user interface. It should further be understood that the mobile communicator 10 may include a plurality of different user interfaces 16, for example, both a touch screen and a keypad.

The transmitter 12 of the mobile communicator 10 may be in operable communication with the user interface 16 and configured to send a transmission from the mobile communicator 10 to an output device having an identity corresponding with the identity input that is inputted into the mobile communicator 10 via the user interface 16. The transmitter 12 may be configured to communicate typical electromagnetic and/or sonic transmissions such as a cell phone voice transmission, an email, a video or picture message, or a transmission that interacts with the internet. For example, the transmitter 12 may be a network adapter or card that is configured to transmit signals through a router or local area network. Alternately, the transmitter 12 of the mobile communicator 10 may be configured to send a transmission on a $3^{rd}$ or $4^{th}$ generation wireless network, or any future wireless networks. It should further be understood that the mobile communicator 10 may include a plurality of transmitters 12.

Likewise, the receiver 14 of the mobile communicator 10 may be capable of receiving a transmission from a transmitting device. The mobile communicator may be configured to receive any type of transmission such as a cell phone voice transmission, an email, a text, video or picture message, or a transmission from a laptop or computer. For example, the receiver 14 of the mobile communicator may be configured to receive local signals from a router, switch or other local area network. Alternately, the receiver 14 of the mobile communicator 1000 may be configured to receive transmissions from $3^{rd}$ or $4^{th}$ generation wireless networks, or any future wireless networks. It should further be understood that the mobile communicator 10 may include a plurality of different receivers 14.

The present invention contemplates that the velocity of the mobile communicator 10 is determinable by at least one speed detection system 36. For example, the mobile communicator 10 may include an internal GPS system for determining velocity. Alternately, the mobile communicator 10 may use another speed detection system such as cell tower triangulation, multilateration, or the like. Furthermore, the speed detection mechanism may be an accelerometer or may be included in a kit such as the kit 400 described herein below. In one embodiment, the speed detection system may actually be a retrieval system for retrieving the speed of the mobile communicator from another device. For example, the speed detection system of the mobile communicator 10 may retrieve the speed from the speedometer of the vehicle that the mobile communicator 10 is located within. Thus, the speed of the mobile communicator 10 may be determined internally by the mobile communicator 10 or may be determined by a third party such as a cell phone service provider (not shown), a vehicle or a kit. It should be understood that the speed detection system 36 may store the speed in the memory device 30 for processing by the processor 22. The speed detection system 36 may further be in operable communication with the vehicle speed detector, such as the speedometer. In this embodiment, the speed detection may be attached to 36, or may actually be the speed detection system of the vehicle. For example, the mobile communicator may be operably connected to the speed detection system of an automobile in order to determine velocity.

Further, in one embodiment, the speed detection system 36 may include a hierarchy system. For example, the GPS system may be activated first. If there is no GPS signal, a secondary system such as cell tower triangulation may be utilized. If this is unavailable, multilateration may be used. The speed detection system 36 may determine which form of speed determination means is best from a battery life, data transfer requirement, or usability perspective.

The mobile communicator 10 may include a circuit 38 that is configured to bring a restricted functionality into a "turned off" state or a "turned on" state depending on the determination that is made by the speed detection system 36. It should be understood that the circuit 38 may be included in the processor 22. Hereinafter, it should be understood that "restricted functionality" may refer to any functionality that is "enabled" or "disabled," by the circuit 38 based at least partially on the speed detected by the speed detection system 36. Hereinafter, it should be understood that the word "disable," or "disabled" refers to the actual process or method by which the circuit 38 disables the restricted functionality of the mobile communicator 10. Likewise, "enable" or "enabled" refers to the actual process or method by which the circuit 38 enables the restricted functionality of the mobile communicator 10. In contrast, when the restricted functionality has been "disabled" by the circuit 38, the restricted functionality will be referred to as being in a "turned off" state. The "turned off" state may refer to any state where the restricted functionality is turned off, disabled, blocked, restricted, or the like. When the restricted functionality has been "enabled" by the circuit 38, the restricted functionality will be referred to as being in a "turned on" state. The "turned on" state may refer to any state where the restricted functionality is turned on, enabled, allowed, unrestricted, or the like.

In a first embodiment, restricted functionality may be in a turned on state by default. In this case, the circuit 38 may disable the restricted functionality of the mobile communicator 10 when the speed detection system 36 determines that the mobile communicator 10 is moving at a speed that is greater than or equal to a certain threshold speed. The threshold speed may be five miles per hour, ten miles per hour, twenty miles per hour or any other suitable speed. Whatever the threshold speed, the circuit 38 may disable the restricted functionality of the mobile communicator 10 when it is determined that there is a potential that the user 60 of the mobile communicator 10 is operating a moving vehicle.

In this embodiment, the restricted functionality may be the text messaging interface of the mobile communicator 10. The circuit 38 may thus disable the text messaging interface when the speed detection system 36 determines that the mobile communicator 10 is moving above the threshold speed. In this embodiment, the mobile communicator 10 may also display a message to the user 60 when the text messaging interface is accessed by the user 60 that tells the user 60 to stop texting or that texting has been disabled and is turned off. The circuit 38 may also be configured to disable any of the receiver 14, the transmitter 12, the user interface 16, the user notification mechanism 20, the display 18 or any of the other various functionalities that the mobile communicator may include, described hereinabove. The circuit 38 may be configured to disable more than one of these functionalities in one or more embodiments. Furthermore, the circuit 38 may be configured to disable the preprogrammed functionalities if the speed detection system 36 is tampered with or does not have any determination of speed. For example, in the case that the speed detection system 36 is a GPS and the mobile communicator 10 is moving through a tunnel, the circuit 38 may be configured to disable texting or phone calls despite that there is no speed determination being made by the speed detection system 36. The mobile communicator 10 may also notify the user 60 via the display 18 when the speed detection system 36 determines that the mobile communicator is moving at a speed that is above a threshold speed. Alternately, the mobile communicator 10 may notify a third party device (not shown), for example, by sending an email to the third party device.

In this embodiment, either or both of the circuit 38 and the speed detection system 36 may not always be in operation. The circuit 38 and the speed detection system 36 may instead be dormant until, for example, the restricted functionality of the mobile communicator 10 is accessed by the user 60. In this situation, the speed detection system 36 and then the circuit 38 may then be activated in order to disable the restricted functionality until an enabling event occurs. It should be understood that restricted applications may include text messaging applications, as described hereinabove. Alternately, either or both of the speed detection system 36 and the circuit 38 may always be in operation. In this embodiment, the speed detection system 36 may be activated constantly or at regular intervals in order to make a determination as to whether the mobile communicator 10 is moving above the threshold speed. The circuit 38 may then disable the restricted functionalities of the mobile communicator 10 if the speed is greater than the threshold speed. It should further be understood that the speed detection system 36 may be activated at more frequent intervals when it is determined that the speed is greater than the threshold speed. However, even in this scenario, the speed detection system 36 may not be constantly in operation, but may instead be activated at regular predetermined intervals in order to conserve battery life of the mobile communicator 10.

Referring still to the embodiment where the restricted functionality is turned on by default, the mobile communicator 10 may further include a user attentiveness detector 40 that is utilized in determining whether the user 60 is in an attentive state. Hereinafter, "attentiveness" will refer to a user's attentiveness toward the mobile communicator 10. For example, a user referred to in an "attentive" state means that the user is attentive to the mobile communicator 10 according to one of the various ways described herein. On the other hand, a user referred to in an "inattentive" state means that the user is not attentive to the mobile communicator 10 because the user is distracted or doing something else such as driving a vehicle.

In one example, the user attentiveness detector 40 may include an image capture device 42, such as a camera or a video capturer. In this embodiment, the image capturer device 42 may provide images that may be used by the processor 22 to determine if the user 60 is looking at the display 18 of the mobile communicator 10. The images may be stored in the memory device 30, for example, and then analyzed by the processor 22 to determine if the user 60 is looking at the display 18, or looking at the image capturer device 42 that may be located on or near the display 18 on the same face of the mobile communicator 10. The image capturing device 42 may further be a beam of infrared radiation that scans the user's face 62 or eyes 64 (shown more particularly in FIG. 4) or any other eye or face detection means.

Figure 4:
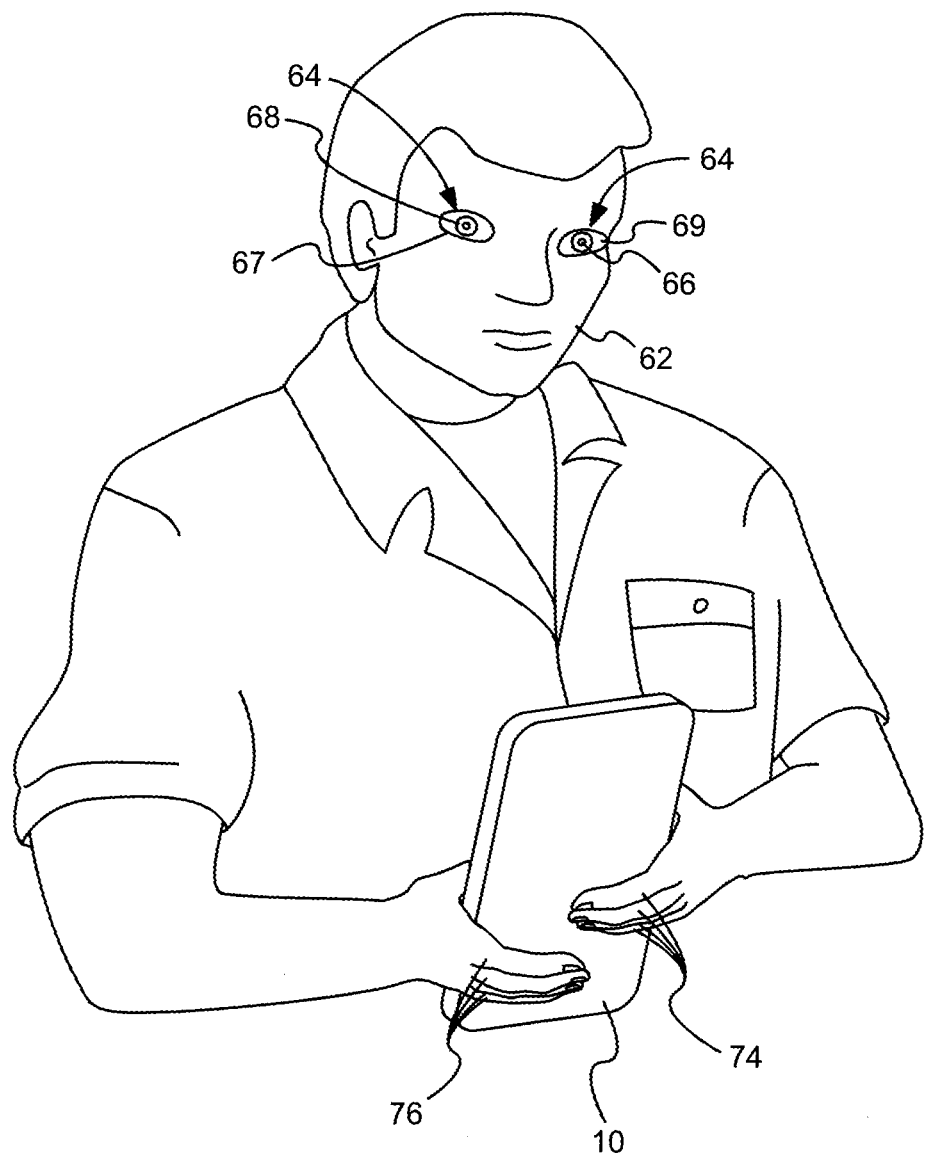
FIG. 4 depicts the mobile communicator of FIGS. 1-2 in the vicinity of a face of a user.

Referring to FIG. 4, a representation of the user's eyes 64 is shown in proximity to the mobile communicator 10. The processor 22 may be programmed to analyze the movements of the user's eyes 64 in particular to determine whether the user 60 is in an attentive state. For example, the processor 22 may determine where the user's pupils 66 are directed. From this information, the processor 22 may determine whether a user's pupils are directed at the display 18 or looking in a direction that is not in the vicinity of the display 18. Alternately, the processor 22 may analyze the location of the cornea 68 or sclera 69 in relation to the eyelids 67 of the eye 64. Whatever the embodiment, the processor 22 may contain a program found on one or both of the memory devices 28, 30 that locates the eyes 64 of one or more users 60 in the vicinity and then determines where the eyes 64 are focused from the pupil 66, sclera 69, and cornea 68. Further, the processor 22 may be configured to operate with the data input from only a single eye 64, in the case that a user has a patch covering one of his or her eyes. In this embodiment, the focus of a single eye 64 may cause the processor 22 to determine that a user 60 is attentive, despite the fact that the second eye of the user is not visible, or not being focused at the display 18.

The processor 22 may analyze the movements of the user's head or face 62 to determine attentiveness. Particularly, the processor 22 may be configured to take the images gathered by the image capture device 42 and make a determination as to whether a user's head 62 is facing the display 18 or looking in a direction that is not in the vicinity of the display 18. Like the eye focusing technology, the mobile communicator 10 may include software that is stored on one of the memory devices 28, 30 and is configured to provide the processor 22 with the capability of making this determination. The user attentiveness detector 40 may further include a laser that is configured to determine the distance from the mobile communicator 10 to the user 60. The laser may be a range finder. A constantly changing distance may be a factor that is utilized by the processor 22 in interpreting whether the user 60 is in an attentive of inattentive state. For example, if the user 60 is constantly varying moving the mobile communicator 10 with respect to his or her face 62, this may indicate to the processor 22 that the user 60 is in an inattentive state. In yet another embodiment, the user attentiveness detector 40 may include facial topography detection in order to determine the direction the user is facing.

The mobile communicator 10 may further be programmed with an algorithm to determine whether the user 60 is in an attentive state or an inattentive state. This program may be configured to determine if the user 60 is actually attentive over a period of time. For example, the user attentiveness detector 40 may provide information to the processor 10 regarding a user's pupil movements multiple times in a second. In one embodiment, the user attentiveness detector 40 or the image capture device 42 may provide the processor 22 analyzable frames at a rate of twenty or more frames per second. It should be understood that the number of individual frames provided by the user attentiveness detector 40 or the image capture device 42 per second may be any appropriate amount. The processor 22 may be configured to analyze each frame to make a determination whether the user 60 is looking at the display 18 in that frame. Then, the processor 22 may be configured to compile the information about each frame and make a determination of the overall attentiveness level of the user 60. Namely, the processor 22 may determine whether the user 60 is currently attentive or currently inattentive. If, for example, it is determined that the user 60 is attentive for a high percentage of frames over a predetermined period of time, the mobile communicator 10 may determine that the user 60 is in an attentive state. Alternately, the mobile communicator 10 may determine that the user 60 is looking at the display 18 only briefly before looking away and that the user 60 is attentive for only a low percentage of frames over a predetermined period of time. The mobile communicator 10 may thus determine that the user 60 is not in an inattentive state.

In one embodiment, the user attentiveness detector 40 may operate completely separately from the speed detection system 36. The embodiments of the user attentiveness detector 40 described herein may be utilized to determine user attentiveness for any appropriate purpose, and may affect any appropriate functionality of the mobile communicator 10 based on the determination of user attentiveness as described herein. For example, the mobile communicator 10 may disable a functionality if it is determined that a user is inattentive, regardless of the speed of the mobile communicator 10 and even if the mobile communicator does not include a speed detection mechanism.

Again referring to the first embodiment where the restricted functionality is turned on by default and then the restricted functionality is then disabled by the circuit 38, if the user attentiveness detector 40 in combination with the processor 22 determines that the user 60 is in an attentive state, the mobile communicator 10 may be programmed such that the processor 22 enables the previously disabled functionality. For example, if the user 60 is driving in the automobile 70 instead of being a passenger, then the text messaging functionality of the mobile communicator 10 may be disabled by the disabling circuit 34 as described hereinabove. However, if the image capture device 38 determines that the user 60 is in an attentive state and looking at the display 18 of the mobile communicator 10, the mobile communicator 10 may be configured to enable the text messaging functionality, or other functionality.

Alternately, if the restricted functionality is turned on by default, the circuit 38 may not immediately disable the restricted functionality if the speed determined by the speed detection system 36 to be greater than the threshold speed. Instead, the processor 22 may be configured to query the user attentiveness detector 40 to determine if a user is attentive. If the user 60 is determined by the processor 22 to be attentive, the circuit 38 may then keep restricted functionality in a turned on state. In contrast, if the user 60 is determined by the processor 22 to be inattentive, the circuit 38 may then disable the restricted functionality so that it is then in a turned off state.

Whatever the embodiment, a predetermined period of inattentive time may result in the processor 22 concluding that the user 60 is in an inattentive state. If the user 60 is determined to be in an inattentive state, the mobile communicator 10 may be placed into a disabled state whereby one or more functionalities, such as text messaging, are disabled. In this embodiment, the processor 22 may be configured to determine that the user 60 is in an inattentive state when, for example, the user 60 is not looking at the display 18 for two consecutive seconds. This duration of inattentiveness may be greater or less than two seconds depending on the embodiment.

In an illustrative example meant to further clarify the first embodiment described above, if the user 60 is traveling in the automobile 70 at a speed greater than the certain threshold speed, the circuit 38 may disable at least one function (such as one or more text messaging interfaces) of the mobile communicator 10. If it is determined that the user 60 is attentive by the user attentiveness detector 40 and the processor 22, the mobile communicator 10 may then enable the previously disabled functionality. If, however, at any point during the turned on text messaging session, the mobile communicator 10 determines that a predetermined period of inattentive time passes, then the circuit 38 may once again disable the restricted functionalities. Alternately, if at any point during a enabled text messaging session the mobile communicator 10 determines that a low percentage of frames over a predetermined period of time show an attentive user 60, the circuit 38 may once again disable the restricted functionalities. Thus, the mobile communicator 10 may be configured to ensure that the restricted functionalities are in a turned off state whenever the user attentiveness detector 26 determines that the user 60 is not attentive, even if it was previously determined that a user was in an attentive state during the restricted functionality session. In other words, the user attentiveness detector 40 and the processor 22 may be configured to constantly monitor the attentiveness state of the user 60 during operation of a restricted function such as text messaging.

In another illustrative example, the user 60 may attempt to use a restricted functionality while traveling at a speed greater than the threshold speed. This may activate the speed detection system 36 and the user attentiveness detector 40. During the gathering of information by these systems, the mobile communicator 10 may be configured to display a message to the user 60 on the display 18, indicating that the mobile communicator is checking the availability of the restricted function. The mobile communicator 10 may include a message stating that the restricted function requires the full attention of the user 60. During this stage, the user 60 may be required to be directly looking at the mobile communicator 10 in order to ensure that the restricted functionality is in a turned on state. If the user 60 is determined to be inattentive, the processor 22 may ensure that the restricted functionality is in a turned off state.

Referring still to FIG. 4, the user attentiveness detector 26 may also comprise other embodiments other than a camera or video capturer. For example, the mobile communicator 10 may further detect that the user 60 is using both hands 72 to type. In this situation, the user attentiveness detector 26 may include a user interface 16 such as a touch screen display that is configured to determine which fingers 74, 76 are typing. The user attentiveness detector 26 may relay information to the processor 22 regarding the finger print used by the user 60. The processor 22 may take this fingerprint information and may be able to determine whether the finger from the left hand 74 or the right hand 76 is being used by the user 60 to compose a text message by determining the orientation of a fingerprint. If the processor 22 determines that both hands 72 are being utilized to type or compose the text message, the processor 22 may determine that the user 60 is in an attentive state. Alternately, if the processor determines that only a single hand 72 is being utilized by the user 60, the processor 22 may determine that the user 60 is in an inattentive state. Furthermore, the user attentiveness detector 26 may determine, via a heat sensor or other sensor, whether the user 60 is holding the phone from both sides with both hands 72. When this information is provided to the processor 22, this may indicate that the user 60 is in an attentive state.

It should be understood that the various functionalities of the mobile communicator 10 described herein may be provided as an inherent property programmed into a mobile communicator such as the mobile communicator 10. Alternately, the embodiments may be provided by one or more downloadable or installable programs, applications or other software or hardware. These applications, downloadable or installable programs or other software may turn a typical mobile communicator into the mobile communicator 10 having one or more embodiments of the present invention, described hereinabove. Furthermore, various methods are also contemplated to accomplish the various embodiments of the mobile communicator 10 described herein.

Figure 5:
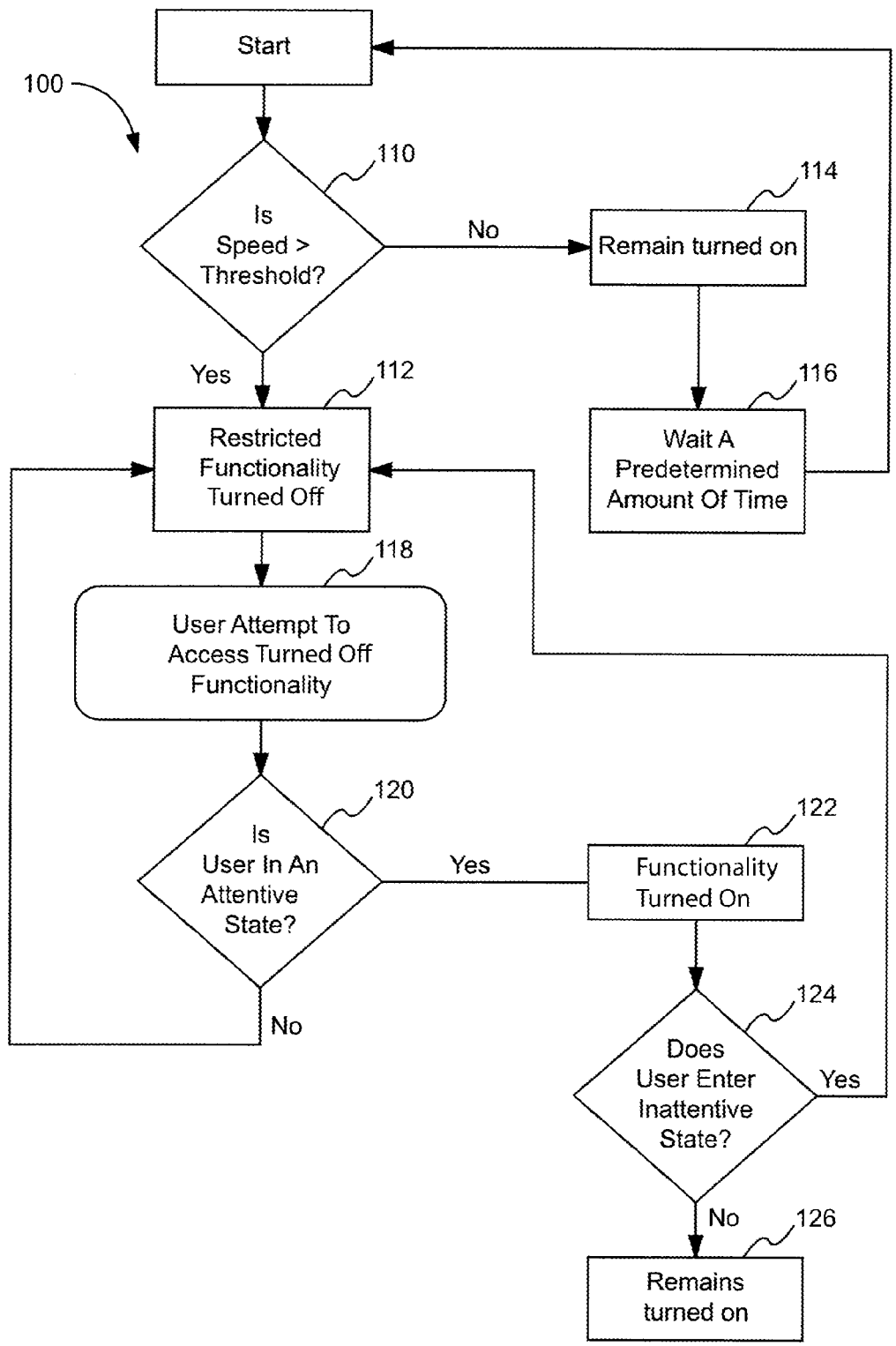
FIG. 5 depicts a flow chart of a process according to one embodiment.

Referring now to FIG. 5, a flow chart of an example of a process or method 100 implemented by the mobile communicator 10 is shown. The method 100 may include an initial default turned on state, as described hereinabove. The method 100 may include a first step 110 where the speed detection system 36 of the mobile communicator 10 determines whether the mobile communicator 10 it is traveling at a speed that is greater than a threshold speed. If the speed is greater than the threshold speed the restricted functionality of the mobile communicator 10 is disabled by the processor 22 whereby the restricted functionality is turned off, shown in box 112. If the speed is less than the threshold speed the restricted functionality of the mobile communicator 10 remains in a state whereby the restricted functionality is turned on, shown in box 114. Whether or not the functionalities are turned on or turned off, the mobile communicator 10 may wait a predetermined time, shown in step 116, before going back to step 110 and making another determination as to the speed of the mobile communicator 10. These steps 110, 112, 114, 116 may continue in a recurring manner as long as the mobile communicator 10 is in an operational state.

If at any point, the user attempts to access a restricted functionality, shown at step 118, the mobile communicator 10 may determine whether the user 60 is in an attentive state, shown at step 120. The determination of attentiveness may be made by the user attentiveness detector 40 and the processor 22 as described in the various embodiments hereinabove. If it is determined that the user 60 is not in an attentive state, the mobile communicator 10 may be configured to keep the restricted functionalities in the turned off state, shown at step 112. If, however, the user 60 is in an attentive state, the mobile communicator 10 may be re-enabled such that the restricted functionalities are turned on, shown at step 122. If the mobile communicator 10 has been re-enabled due to user attentiveness, the method 100 may then include continuously determining if the user remains in an attentive state for the entirety of the restricted functionality session, or alternately whether the user ever becomes inattentive. This is shown in step 124. If the user 60 remains attentive, the restricted functionality of the mobile communicator 10 may remain in a turned on state for the entirety of the restricted functionality session, shown in step 126. If however, the user 60 ever becomes inattentive during the restricted functionality session, the mobile communicator 10 may revert back to the turned off state of step 112.

Figure 6:
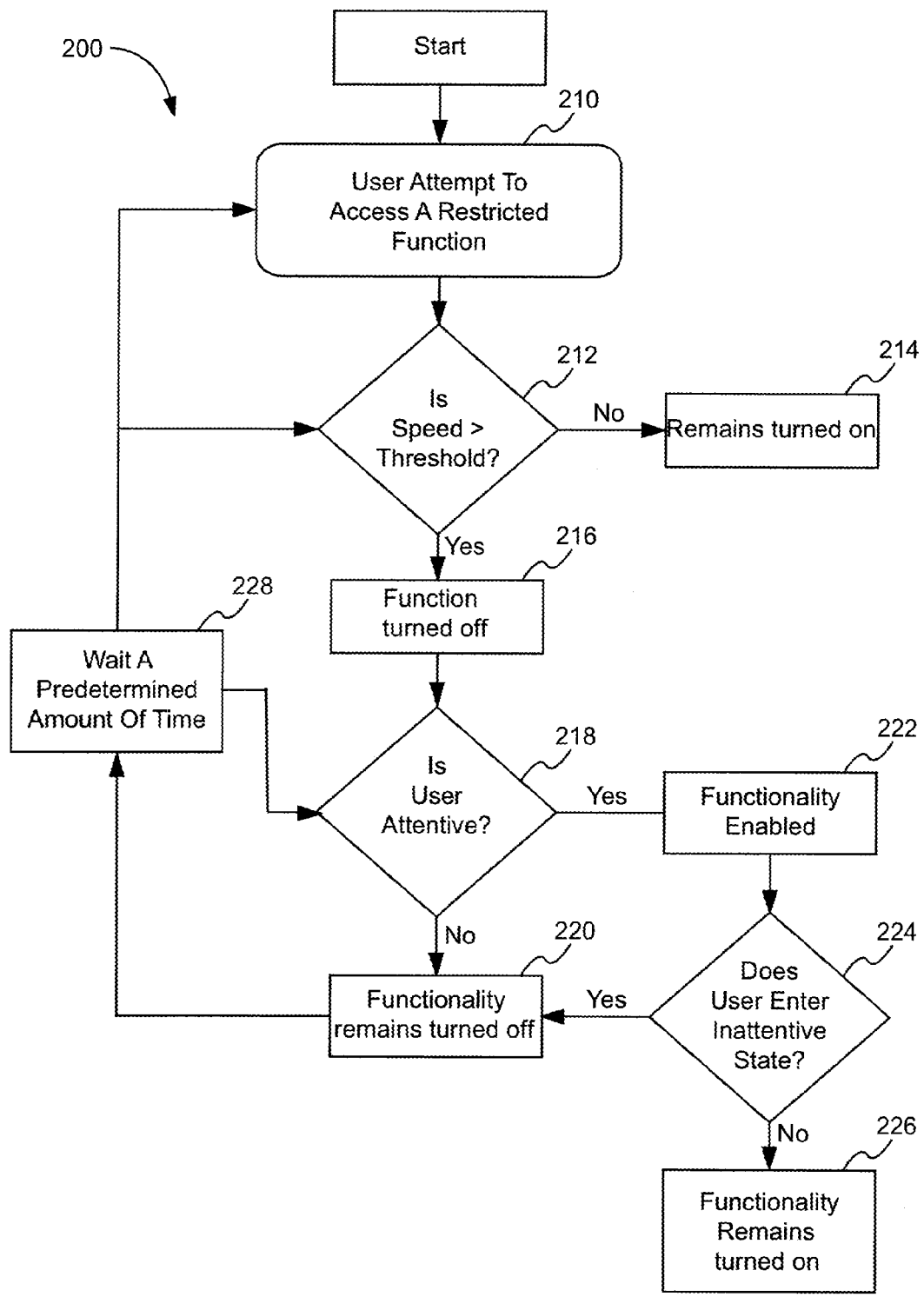
FIG. 6 depicts another flow chart of a process according to one embodiment.

Referring now to FIG. 6, another flow chart of an example of a process or method 200 implemented by the mobile communicator 10 is shown. The method 200 may be initiated in this case by the user 60 attempting to access a restricted function, shown at step 210. This is differentiated from the method 100 because the mobile communicator 10 is not constantly monitoring speed, and is only monitoring speed if a restricted functionality is attempted to be accessed by the user 60. The mobile communicator 10 may then be configured to determine whether the speed is greater than a certain threshold, shown in step 212. If the speed is less than the threshold speed, the restricted functionality may be in a turned on state, shown in step 214. If, however, the speed is greater than the threshold speed, the restricted functionality may be in a turned off state, shown in step 216. Next, the mobile communicator 10, the user attentiveness detector 40 and the processor 22 may determine if the user is in an attentive state, shown at step 218. If the user 60 is in an inattentive state, the restricted functionality may be disabled or be in a turned off state, shown in step 220. It should further be understood that the disabling step 216 may not be necessary, and may be simply integrated into the disabling step 220. If, however, the user 60 is in an attentive state, the processor 22 may ensure that the restricted functionality is in a turned on state, shown in step 222. It should be understood that this step may simply be an absence of the disabling step 220 in the case that the mobile communicator 10 was never disabled in step 216. Further, if the mobile communicator remains in a turned on state or becomes re-enabled in step 216, the mobile communicator 10 may continuously determine whether the user 60 remains in the attentive state, shown in step 224. If the user 60 remains in an attentive state, the restricted functionality remains turned on for the entirety of the restricted functionality session, shown in step 226. If, however, the user 60 ever enters an inattentive state, the functionality may revert back to being turned off, shown in step 220. When the functionality remains turned off in step 220, the mobile communicator 10 may wait for a predetermined amount of time before reverting back to checking whether the speed is greater than a threshold speed. This waiting step is depicted at step 228. Alternately, the mobile communicator 10 may simply exit out of the restricted functionality or application. Thus, the user may have to re-access the restricted application and being the method 200 anew. For example, if the user 60 becomes inattentive, the mobile communicator 10 may display a message to the user 60 that the restricted program will now close because of the user's inattentive state.

The embodiments described hereinabove assume that the mobile communicator 10 has one or more restricted functionalities, such as text messaging interface, which is in a default turned on state. Thus, it has been described that the restricted functionality is disabled by the circuit 38 when the speed detection system 36 determines that the speed is greater than a certain threshold speed and a user is attentive. However, it should be understood that the restricted functionality of the mobile communicator 10 may initially be in a default turned off state. In other words, the mobile communicator 10 may be turned off by default, and be enabled by the circuit 38 if the speed detection system 36 determines that the speed is less than a certain threshold. Further, the restricted functionality may remain in the default turned off state if the speed detection system 36 determines that the speed is greater than a certain threshold. Then, if the user attentiveness detector 40 and the processor 22 determine that a user is attentive, the circuit 38 may be configured to enable the restricted functionality such that it is in a turned on state. Whatever the embodiment, it should be understood that the restricted functionality of the mobile communicator 10 may be configured to be in a turned off state if a user is inattentive and that the speed detection system 36 determines that the speed is greater than the threshold speed (or if the speed detection system 36 determines that the speed isn't less than the threshold speed).

Figure 7:
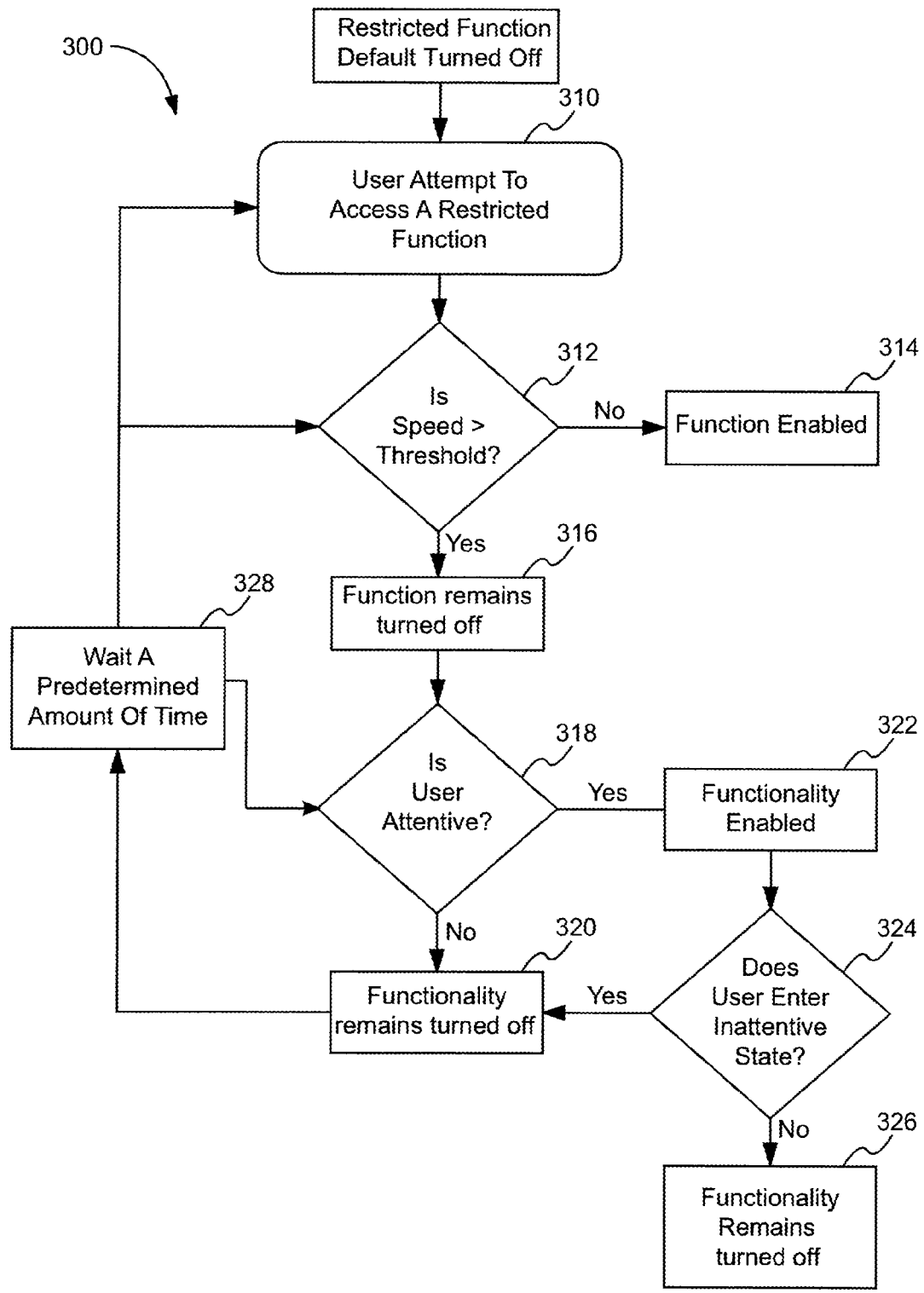
FIG. 7 depicts another flow chart of a process according to one embodiment.

Shown in FIG. 7 is a flow chart of an example of another process or method 300 implemented by the mobile communicator. In this example, the process 300 begins with the restricted functionality in the default turned off state. The user 60 may then attempt to access a restricted function, shown at step 310. The mobile communicator 10 may then be configured to determine whether the speed is greater than a certain threshold, shown in step 312. If the speed is less than the threshold speed, the restricted functionality may then be enabled, shown in step 314. If, however, the speed is greater than the threshold speed, the restricted functionality may remain in a turned off state, shown in step 316. Next, the mobile communicator 10, the user attentiveness detector 40 and the processor 22 may determine if the user is in an attentive state, shown at step 318. If the user 60 is in an inattentive state, the restricted functionality may remain in a turned off state, shown in step 320. If, however, the user 60 is in an attentive state, the processor 22 may ensure that the restricted functionality is in a turned on state by enabling the restricted functionality, shown in step 322. It should be understood that in another embodiment, the mobile communicator 10 may first check for user attentiveness and then check for speed after the mobile communicator determines whether a user is attentive. Further, the mobile communicator 10 may continuously determine whether the user 60 remains in the attentive state, shown in step 324. If the user 60 remains in an attentive state, the restricted functionality remains turned on for the entirety of the restricted functionality session, shown in step 326. If, however, the user 60 ever enters an inattentive state, the functionality may revert back to being turned off, shown in step 220. When the functionality remains turned off in step 320, the mobile communicator 10 may wait for a predetermined amount of time before reverting back to checking whether the speed is greater than a threshold speed. This waiting step is depicted at step 328. Alternately, the mobile communicator 10 may simply exit out of the restricted functionality or application. Thus, the user may have to re-access the restricted application and begin the method 300 anew. For example, if the user 60 becomes inattentive, the mobile communicator 10 may display a message to the user 60 that the restricted program will now close because of the user's inattentive state. Further, the user may exit the restricted functionality voluntarily, causing the method 300 to begin anew the next time the user 60 attempts to access the restricted functionality.

Furthermore, in another embodiment, one or more of the functionalities described herein may be provided in the form of one or more kits, such as a kit 400 for a mobile communicator 410, as shown in FIG. 8. In this embodiment, the mobile communicator 410 may be a typical cell phone or may be a cell phone with any or all of the added functionality described hereinabove with respect to the mobile communicator 10. However, any or all of the described functionality including the speed detection system 36, the disabling circuit 38, the user attentiveness detector 40, and the image capture device 42, described hereinabove, may be included on the kit 400. It should be understood that the kit 400 may includes its own separate processor, memory, computer code, and input device. The kit 400 may be in operable communication with the mobile communicator 410 either via a wired or a wireless system. Once the mobile communicator 410 is linked to the kit 400, the speed detection system 36, the disabling circuit 38, the user attentiveness detector 40, and/or the image capture device 42 of the kit 400 may affect the functionality of the mobile communicator 410 in the ways described hereinabove. It should be understood that the kit 400 may be integrated into a vehicle during, for example, the manufacturing of the vehicle. Furthermore, it should be understood that the kit 400 may include multiple separate components for performing separate functionalities, rather than a single device as depicted in FIG. 8.

Furthermore, the kit 400 may generate a signal that may enable the mobile communicator 410. The kit 400 may be portable, or built into a vehicle or structure. The kit 400 may be utilized to enable the mobile communicator 410 when, for example, there is no GPS signal available for the speed detection system 36 of the mobile communicator 10. The kit 400 may include an independent means of detecting motion or movement so that if the kit 400 was moving, the signal may be disabled to prevent a user from bringing the kit 400 into a car to allow them to utilize the restricted functionality in a manner that would not otherwise be enabled. Alternately, kits 400 may be integrated into vehicles such that their enabling signals are only accessible to areas of the vehicle where passengers are located. For example, the back seat of a passenger vehicle may include the kit 400 for enabling this area of the vehicle. The kit 400 is shown being powered from an outlet 420. However, it should be understood that the kit 400 may include its own internal battery or may be plugged into an automobile as would be known to those skilled in the art.

Figure 9A:
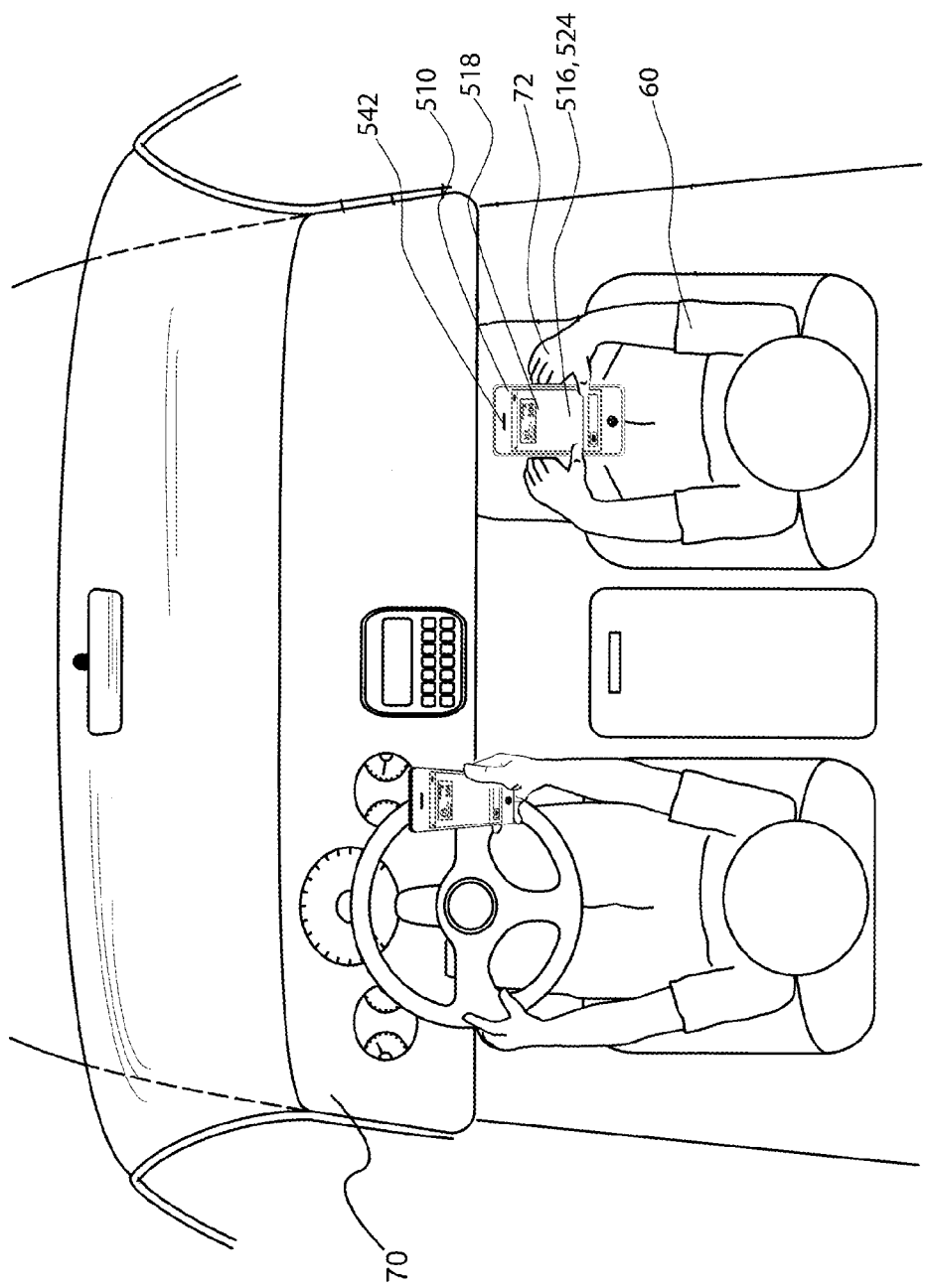
FIG. 9a depicts a mobile communicator according to another embodiment.
Figure 9B:
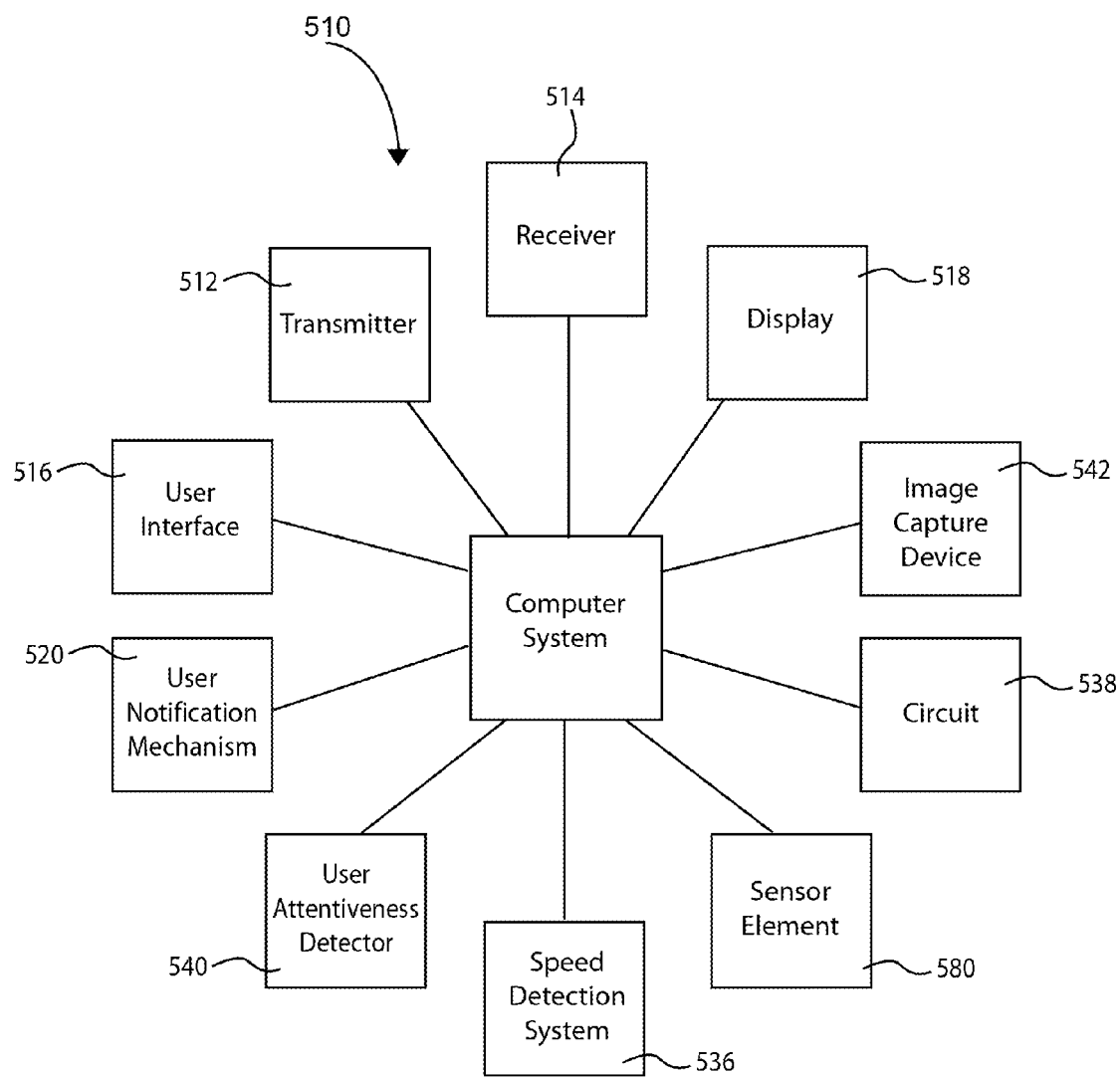
FIG. 9b depicts a schematic view of the mobile communicator of FIG. 9a according to one embodiment.

Referring now to FIGS. 9a-9b, another embodiment of a mobile communicator 510 is shown both in perspective and schematically. The mobile communicator 510 may include all of the elements described with respect to the mobile communicators 10, 410, including a receiver 514, a display 518, an image capture device 542, a circuit 538, a speed detection system 536, a user attentiveness detector 540, a user notification mechanism 520, a user interface 516 which may also be an input device 524, a transmitter 512, and a computer system 550. In this embodiment, the display 518 is a touch screen device which includes the user interface 516 and at least one input device 524. The computer system 550 may further include a processor having memory devices and input and output devices (not shown), similar to the computer system 50. In addition to these previously described elements, the mobile communicator 510 may also include a sensor element 580.

Figure 10:
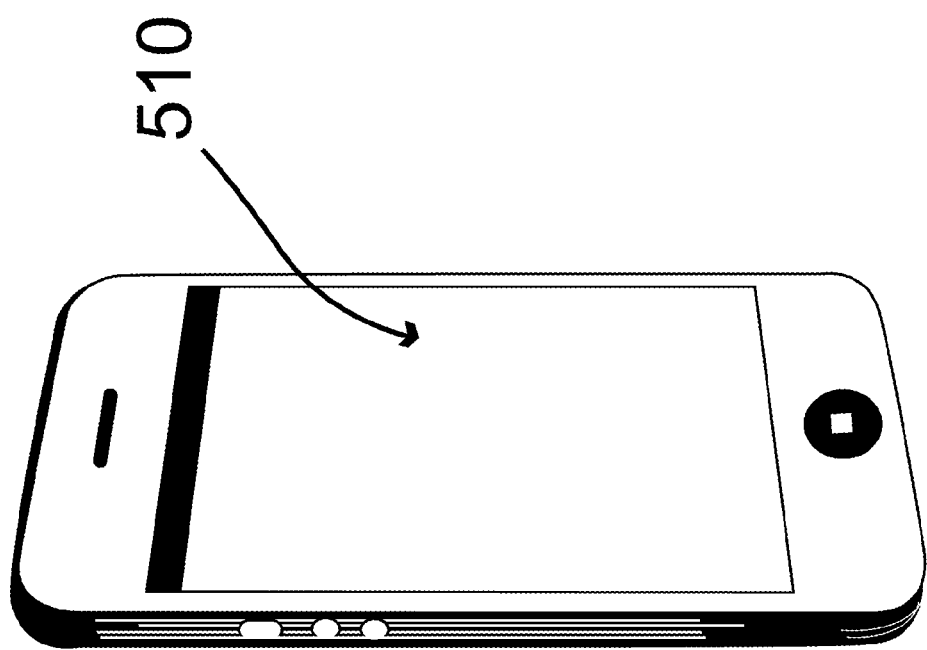
FIG. 10 depicts the mobile communicator of FIG. 9 in a vertical orientation.
Figure 11:
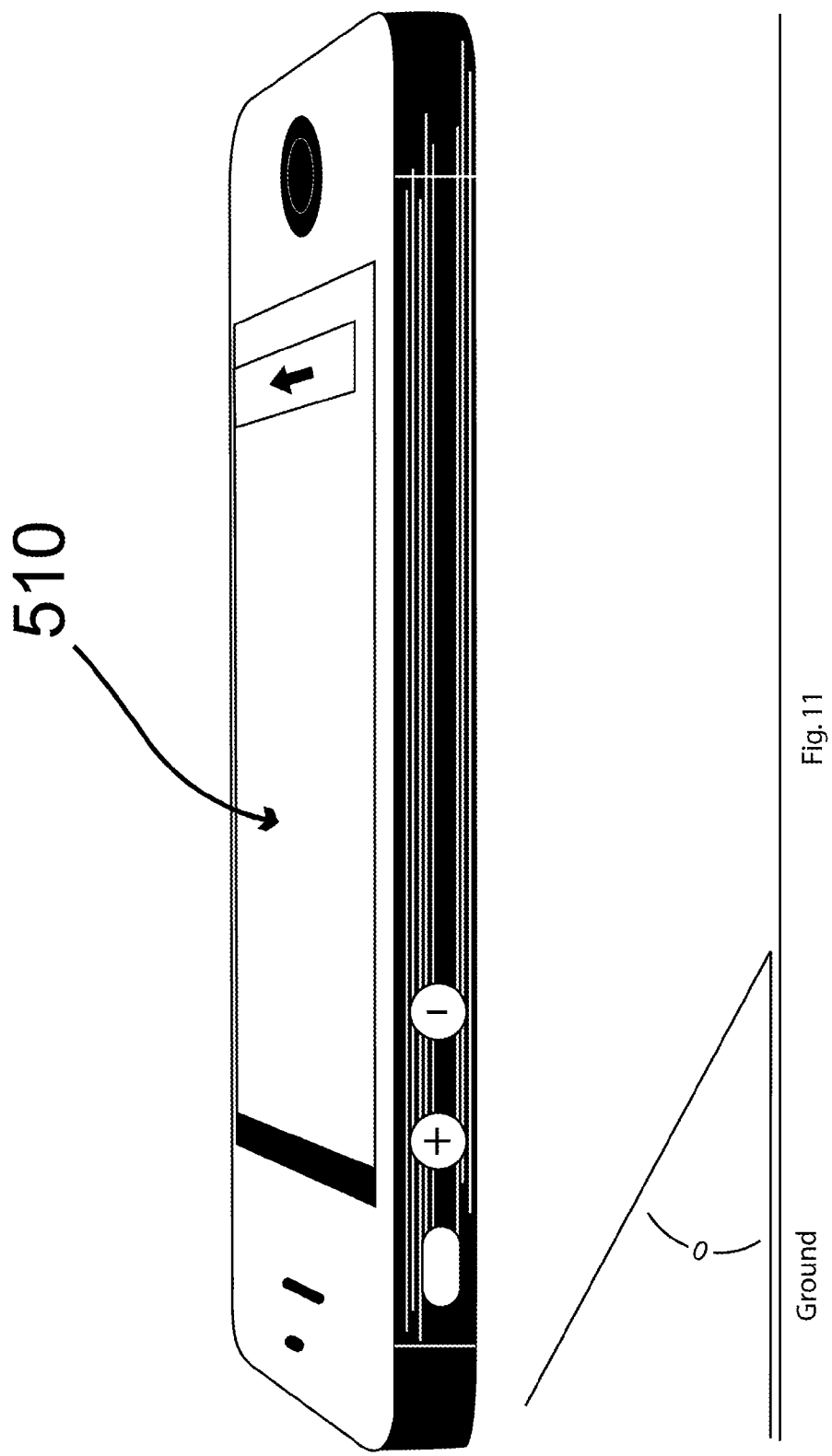
FIG. 11 depicts the mobile communicator of FIGS. 9-10 in a horizontal orientation.

The sensor element 580 may be configured to determine the orientation of the mobile communicator 510. For example, the sensor element 580 may be a gyroscope or device capable of determining the orientation of the mobile communicator 510 with respect to the earth. In other words, the sensor element 580 may be configured to determine if the mobile communicator 510 is in an upright position, as shown in FIG. 10, or alternately is in a horizontal position, as shown in FIG. 11. The sensor element 580 may be configured to ensure that the mobile communicator 510 is in a turned off state when the mobile communicator is moving at a speed that is faster than the threshold speed and the sensor element 580 determines that the mobile communicator 510 is in an upright position, as shown in FIG. 10. The sensor element 580 may be a gyroscope, an accelerometer, or a horizon indicator system, for example. It should be understood that the sensor element 580 may be any means of sensing the orientation of the mobile communicator 510. The sensor element 580 may be integrated in the mobile communicator 510 itself, or may be an attachable kit that can allow a mobile communicator 510 to determine its own orientation.

It should be understood that the term "upright" may mean substantially upright, but not exactly vertical with respect to the ground. For example, the mobile communicator 510 may be considered in an upright position if it is at an angle from a perfectly vertical position that is less than or equal to a first predetermined angle $\alpha$. In one embodiment, the mobile communicator 510 may be considered in an upright position if it is within 45 degrees from the perfectly vertical position. This first angle $\alpha$ is, of course variable and not limited to the angle shown. It may be found that a greater angle than 45 degrees may be necessary to accommodate appropriate usage of the mobile communicator without being a nuisance to the user. Alternately, it may be found that a lesser angle than 45 degrees may be required to ensure that a user cannot text while driving. In one embodiment, the first angle α is between 25 and 65 degrees.

It should further be understood that the term "horizontal" may mean substantially horizontal, but not exactly horizontal with respect to the ground. For example, the mobile communicator may be considered in a horizontal position if it is at an angle from a perfectly horizontal position that is less than or equal to a second predetermined angle θ. In one embodiment, this second angle θ may equal to 90 degrees minus the first angle α described hereinabove.

In any embodiment, the first and second angles α, θ should be specifically determined in order to force a user to rotate his head sufficiently in a downward direction in order to directly face the display 518 of the mobile communicator 510 when the mobile communicator 510 is in a horizontal position. Thus, the mobile communicator 510 may be able to prevent a driver 582 from circumventing the user attentiveness detector 540 by holding up the mobile communicator 510 in the front of his face while he is driving. Without this feature, holding up the mobile communicator 510 in such a way by a user might circumvent the attentiveness detector 540 by making it appear that the user's eyes are actually looking at the mobile communicator 510 when in reality the user is actually driving and looking at the road behind the mobile communicator 510. With this feature, a user could not hold the phone up in this position because a vertically positioned phone would remain in a turned off state. To be turned on, the phone would need to be angled even further upwards such that it is held within the horizontal position. It would thereby not be possible for a user to directly face the display 518 while holding up the phone to the dashboard of front windshield while driving, preventing any circumvention of the technology.

In some embodiments, the mobile communicator 510 may notify the user on the display 518 when the mobile communicator 510 is both moving at a speed greater than the threshold speed and is not in a horizontal position. In this case, the mobile communicator 510 may display a message to the user. For example, the mobile communicator may 510 may display a message that states: "If you are not driving, please rotate your mobile communicator into a horizontal position to resume text messaging."

Figure 12:
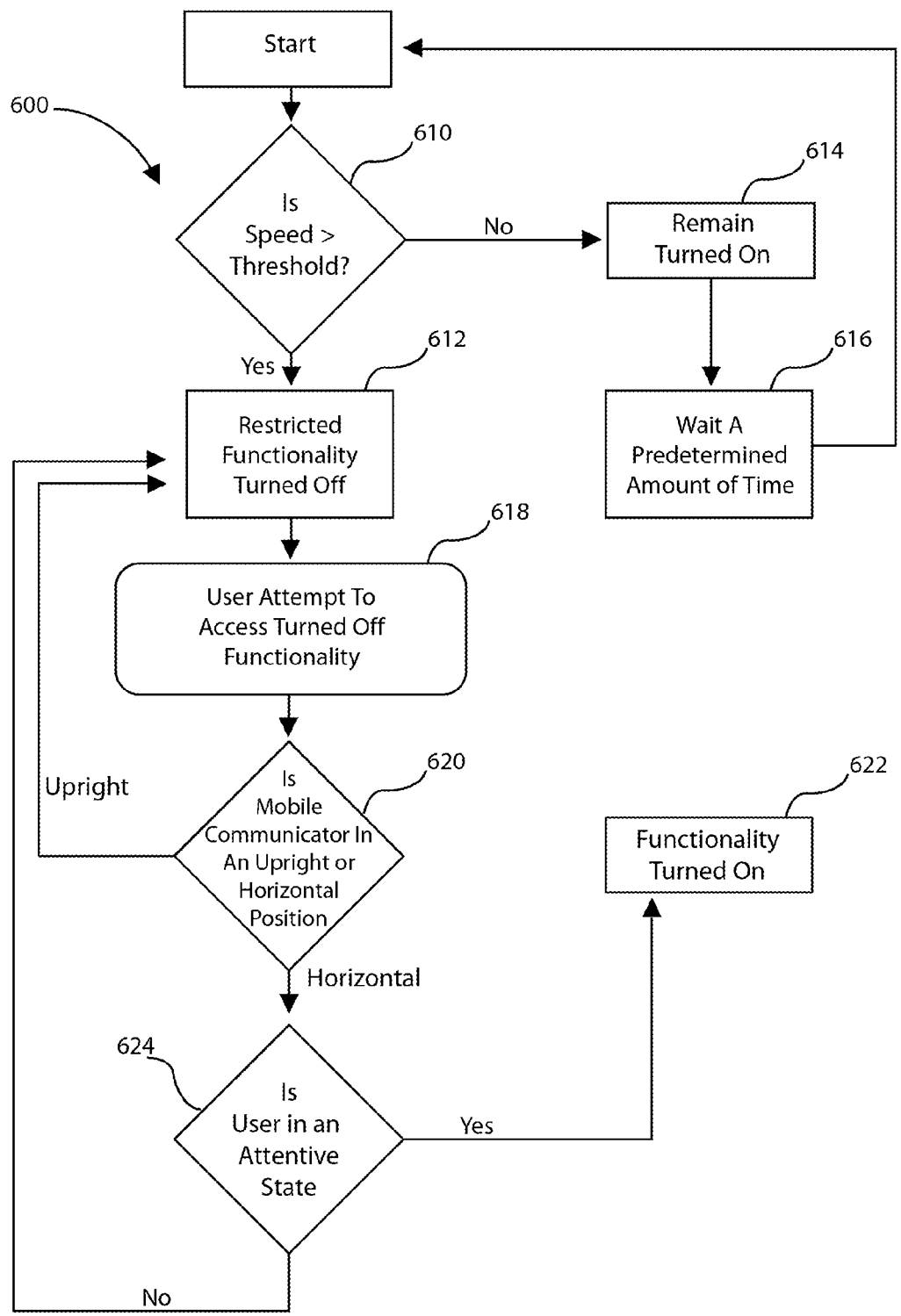
FIG. 12 depicts a flow chart of a process according to one embodiment.

Referring now to FIG. 12, a flow chart of an example of a process or method 600 implemented by the mobile communicator 510 is shown. The method 600 may include an initial default turned on state, as described hereinabove. The method 600 may include a first step 610 where the speed detection system 536 of the mobile communicator 510 determines whether the mobile communicator 510 it is traveling at a speed that is greater than a threshold speed. If the speed is greater than the threshold speed the restricted functionality of the mobile communicator 510 is disabled by the computer system 550 or the processor of the computer system 550 whereby the restricted functionality is turned off, shown in box 612. If the speed is less than the threshold speed, the restricted functionality of the mobile communicator 510 remains in a state whereby the restricted functionality is turned on, shown in box 614. Whether or not the functionalities are turned on or turned off, the mobile communicator 510 may wait a predetermined time, shown in step 616, before going back to step 610 and making another determination as to the speed of the mobile communicator 510. These steps 610, 612, 614, 616 may continue in a recurring manner as long as the mobile communicator 510 is in an operational state.

If at any point, the user attempts to access a restricted functionality when the speed has been determined to be greater than the threshold speed, shown at step 618, the sensor element 580 of the mobile communicator 510 may first determine whether the mobile communicator 510 is in an upright or horizontal position, shown at step 620. If the sensor element 580 determines that the mobile communicator 510 is in a vertical position, the computer system 550 of the mobile communicator is configured to keep the restricted functionality turned off, shown at step 622.

On the other hand, if the sensor element 580 determines that the mobile communicator 510 is in a horizontal position, the computer system 550 may then proceed to determine whether a user is attentive, shown at step 624. The determination of whether a user is attentive may be made in a similar or the same manner to the methods described hereinabove. If the sensor element 580 determines that the user is attentive in step 624, the computer system 550 may then turn on the restricted functionality, shown in step 622. From here, the mobile communicator 510 may continually check to make sure that the user is attentive, and the mobile communicator 510 is in a horizontal state, or else the mobile communicator may revert back to step 612, where the restricted functionality is turned off. This process may continue, for example, until the user 60 stops trying to use the restricted functionality.

Thus, the method 600 may provide an additional step compared to the methods described hereinabove in FIGS. 1-8, whereby the mobile communicator 510 is configured to determine its own orientation. This determination is another prerequisite for allowing access to the restricted functionality. It should be understood that the particular step of determining the orientation of the mobile communicator 510 may be performed at any point in the overall process. Thus, for example, the mobile communicator 510 may be configured to determine the orientation after a determination of user attentiveness has been made. Thus, if a user is determined to not be attentive, the mobile communicator 510 may automatically maintain the restricted functionality in a turned off state without even needing to activate the sensor element 580 to determine orientation.

Figure 13:
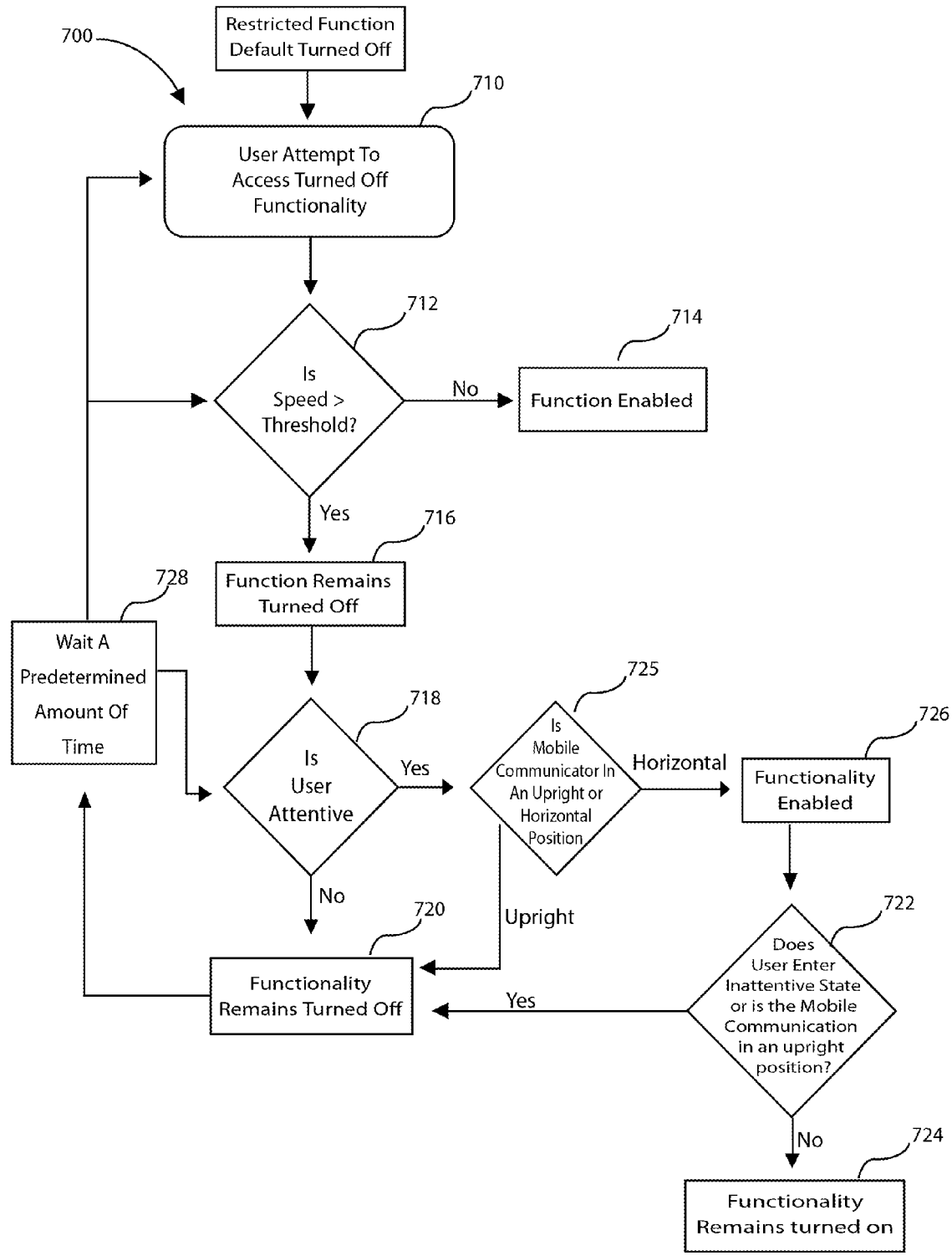
FIG. 13 depicts a flow chart of a process according to another embodiment.

Shown in FIG. 13 is a flow chart of an example of another process or method 700 that may be implemented by the mobile communicator. In this example, the process 700 begins with the restricted functionality in the default turned off state. The user 60 may then attempt to access a restricted function, shown at step 710. The mobile communicator 510 may then be configured to determine whether the speed is greater than a certain threshold, shown in step 712. If the speed is less than the threshold speed, the restricted functionality may then be enabled, shown in step 714. If, however, the speed is greater than the threshold speed, the restricted functionality may remain in a turned off state, shown in step 716. Next, the mobile communicator 510, the user attentiveness detector 540 and the processor 522 may determine if the user is in an attentive state, shown at step 718. If the user 60 is in an inattentive state, the restricted functionality may remain in a turned off state, shown in step 720. If, however, the user 60 is in an attentive state, the processor may ensure that the restricted functionality is in a turned on state by enabling the restricted functionality, shown in step 722. It should be understood that in another embodiment, the mobile communicator 510 may first check for user attentiveness and then check for speed after the mobile communicator determines whether a user is attentive. Further, the mobile communicator 510 may continuously determine whether the user 60 remains in the attentive state. If the user 60 remains in an attentive state, the computer system 550 may then be configured to then determine the orientation of the mobile communicator 510, shown in step 725. It should be understood that this step may be performed at any stage of the method 700. The restricted functionality may then remain turned on for the entirety of the restricted functionality session if the user is found to remain attentive and the mobile communicator is found remain oriented in a horizontal position, as shown in step 726. If, however, the user 60 ever enters an inattentive state or the mobile communicator becomes oriented in a vertical position, as shown in step 722, the functionality may revert back to being turned off, shown in step 724. When the functionality remains turned off in step 720, the mobile communicator 510 may wait for a predetermined amount of time before reverting back to checking whether the speed is greater than a threshold speed (not shown). Alternately, the mobile communicator 510 may simply exit out of the restricted functionality or application. Thus, the user may have to re-access the restricted application and begin the method 700 anew. For example, if the user 60 becomes inattentive, the mobile communicator 510 may display a message to the user 60 that the restricted program will now close because of the user's inattentive state. Further, the user may exit the restricted functionality voluntarily, causing the method 700 to begin anew the next time the user 60 attempts to access the restricted functionality.

In another embodiment, the mobile communicator 10, 410, 510 may include an override system that may enable the restricted functionality when one or more second conditions are met, despite the disabling of the restricted functionality or turned off state of the restricted functionality provided by the methods 100, 200, 300, 600, 700 as described hereinabove. For example, the mobile communicator 10, 410, 510 may include software that enables the restricted functionality based on the second condition, which may be, for example, biometrics, an accelerometer, motion detection, the time of day, a password, voice command, a wife signal being present or the like. These second conditions may be configured to turn on the restricted functionality despite otherwise being restricted by the methods 100, 200, 300, 600, 700 described hereinabove.

In yet another embodiment, a cell tower, GPS satellite, or other communication means (not shown) may be configured to send an enabling signal to the mobile communicator 10, 410, 510. This enabling signal may be configured to allow use of the one or more restricted functionalities despite otherwise being restricted by the methods 100, 200, 300, 600, 700. For example, the mobile communicator 10, 410, 510 may be configured to learn its geographic location from this signal and auto configure itself based on the laws within the present geographic location. For example, if a certain jurisdiction where the mobile communicator 10, 410, 510 was currently present in included laws which prevent texting while driving, the mobile communicator 10, 410, 510 may included restrictions in accordance with these laws. In other words, one or more of the methods 100, 200, 300, 600, 700 may be implemented. On the other hand, if the mobile communicator 10, 410, 510 entered a jurisdiction where this was legal, the mobile communicator 10, 410, 510 may allow for usage of the restricted functionality without subjecting the mobile communicator 10, 410, 510 to the methods 100, 200, 300, 600, 700.

The mobile communicator 10, 410, 510 may also be configured to integrate with a dock, hoister, or other kit device (not shown). Placement in the dock or hoister may automatically enable both a voice-to-text mode and a text-to-voice mode in the mobile communicator 10, 410, 510. This voice-to-text and text-to-voice functionality may be interpreted and processed within the mobile communicator 10, 410, 510, or may be sent off-site to be interpreted by another agency or third party such as the cell provider or head end in the communications network.

In another embodiment, the mobile communicator 10, 410, 510 may be configured to monitor its own physical location and speed. The mobile communicator 10, 410, 510 may use a location monitoring system such as GPS in order to determine the speed limit of a road that the mobile communicator 10, 410, 510 may be traveling on. In this embodiment, should the device travel faster than the known speed limit, an off site administrator could receive a notification of the potential violation. Thus, a transportation company may issue company mobile communicators which help the company monitor the speeds of their drivers.

Similar to this off site monitoring embodiment, the methods 100, 200, 300, 600, 700 may collect data which is sent directly to an off site administrator. In other words, the orientation information, speed information, and user attentiveness information may all be sent to an off site administrator which may, either automatically or manually, allow for the restricted functionality to be accessed by the user 60. This may be accomplished by the administrator either enabling the restricted functionality that has been already turned off, or by not disabling a functionality that is already turned on, depending on the method 100, 200, 300, 600, 700 utilized.

Moreover, other aspects of the method 100, 200, 300, 600, 700 may be performed or performable off site by a third party in order to reduce computing load on the mobile communicator 10, 410, 510. In one embodiment, a third party such as a cell provider or cell tower may determine that the mobile communicator 10, 410, 510 is moving over a speed threshold. The cell tower or cell provider may send a signal to the mobile communicator 10, 410, 510 to enable the user attentiveness detection method described hereinabove.

In another embodiment, the mobile communicator 10, 410, 510 may be in operable communication with a steering wheel 71 of the automobile 70. The steering wheel 71 may include a sensor element and a computer system that are capable of detecting the number of hands on the steering wheel. It should be understood that the computer system may be a computer system of the automobile 70 that is in communication with the sensor on the steering wheel. If both hands are found to be on the steering wheel, the computer system may send a signal within the automobile 70 that automatically allows for any restricted functionalities to be turned on or otherwise become available despite methods 100, 200, 300, 600, 700. This may be implemented by software, a separate kit integrated into the mobile communicator 10, 410, 510 or the automobile 70 that is designed to send the signal. It is further contemplated that conductive gloves (not shown) worn by the driver may integrate with the circuitry of the steering wheel 71.

Wireless or other electrical signals common in buildings (WIFI, for example) may be used in the methods 100, 200, 300, 600, 700 to enable a turned off restricted functionality. For example, a WIFI wireless signal available in a building may automatically enable the mobile communicator 10, 410, 510 despite the fact that speed detection is not available. For example, in a building where a GPS signal is unavailable and so at least one of the above methods 100, 200, 300, 600, 700 would otherwise result in a "turned off" restricted functionality, a WIFI signal, or connecting to a WIFI network may "turn on" the restricted functionality. The frequency and wavelength of the light in the vicinity of the mobile communicator may also be detectable by the mobile communicator in order to determine whether the mobile communicator was in a building room or in a vehicle or the like.

Similarly, a vision detection or camera technology of the mobile communicator 10, 410, 510 may be configured to detect the color of light of the room. Alternately, the mobile communicator 10, 410, 510 may be configured to detect the temperature of the room. It should be understood that "room" may also mean a room in a train, bus, airplane, or the like. These detections by the mobile communicator 10, 410, 510 may all be utilized in order to determine whether the mobile communicator was located in a building rather than outside in an automobile. Again, this may allow the usage of the restricted functionality in a building that does not allow for any GPS signal to reach the mobile communicator 10, 410, 510, causing the mobile communicator 10, 410, 510 to be otherwise turned off due to the methods 100, 200, 300, 600, 700.

In another embodiment, the mobile communicator 10, 410, 510 may send out an auto reply to any users of other devices that are attempting to contact the mobile communicator 10, 410, 510 via the restricted functionality that is turned off pursuant to the methods 100, 200, 300, 600, 700 described hereinabove. This auto reply message may be a notification that allows the user of the other device to know that the user 60 will be available later. In one embodiment, this notification may be initiated by the user 60 pressing a button on the mobile communicator 10, 410, 510. In another embodiment, the auto reply is initiated automatically.

In embodiments that include the restricted functionality in a default state that is "turned off," an enabling signal may be required to enable the restricted functionality such that the restricted functionality becomes "turned on." As described hereinabove, in one embodiment this occurs when one or more conditions have been met. For example, the condition may be when a user is traveling below a setpoint speed, and/or the user is attentive, and/or the mobile communicator is in a horizontal orientation. However, in some situations, a default disabled mobile communicator 10, 410, 510 may remain in a turned off state even though the mobile communicator 10, 410, 510 is not moving above a threshold speed. This may occur, when, for example, the mobile communicator 10, 410, 510 is not in a location that is capable of enabling the default turned off function. For example, this may occur when the mobile communicator 10, 410, 510 is located in a location that does not receive a GPS signal for determining speed. However, in this situation, it is contemplated that the mobile communicator 10, 410, 510 may be configured to remain in the last "turned on" state when no enabling signal is present. Thus, in one embodiment, if a person is driving above a threshold speed, the mobile communicator 10, 410, 510 may remain in the default turned off state. Then, once the mobile communicator 10, 410, 510 stops moving at the threshold speed, the condition has been met and the restricted functionality of the mobile communicator 10, 410, 510 is enabled and turned on. However, once the user enters a location where there is no GPS signal, the condition has no longer been met. However, in the presently contemplated embodiment, when no signal is receivable by the mobile communicator 10, 410, 510 that would allow the mobile communicator 10, 410, 510 to determine that the condition has been met, the restricted functionality is configured to remain in its last "turned on" state. As such, the restricted functionality would still be available if a user enters a location that has no GPS service. However, if the user enters a tunnel while driving, the most recent state is a "turned off" state. As such, the mobile communicator 10, 410, 510, would not be configured to switch states when no signal is available to make the determination as to whether the condition has been met.

The mobile communicator 10, 410, 510 configured to determine attentiveness may also be configured to determine the identity of the user of the mobile communicator 10, 410, 510. In one embodiment, this may be used for targeted advertising from applications of the mobile communicator 10, 410, 510 to the particular user of the mobile communicator 10, 410, 510. The location detection system of the mobile communicator 10, 410, 510 may also be used for targeted advertising in the same manner. If a particular user is located in a particular location, the mobile communicator 10, 410, 510 can provide targeted advertising based the identity of the user, and the location of the user.

It should be understood that the GPS may not be the only speed detection mechanism available to the mobile communicator 10, 410, 510 and the methods 100, 200, 300, 600, 700. For example, Radio-frequency pattern matching (RFPM) may enable the use of mobile phone signals to locate wireless devices in any environment. This may also be utilized in order to determine speed.

In yet another embodiment, a mobile communicator, such as one of the mobile communicators 10, 410, 510 may be default disabled such that a hardware interface of the mobile communicator is turned off by default. For example, in one embodiment, the screen of the mobile communicator may remain in a turned off state by default. In this state, a message may be displayed on the screen instructing a user how to activate the screen. When the screen is in the turned off state, the screen may not accept any typical inputs, and may not unlock in the typical manner. Moreover, in this state the GPS system or any other appropriate system of the mobile communicator may also remain turned off. Then, when a user wants to use the mobile communicator, the user may press a button on the touch screen or a physical button on the housing of the mobile communicator in order to activate the GPS system or any other appropriate system and begin a determination of speed. From there, the methods 100, 200, 300, 600, 700 described herein may be initiated. In other words, the activation of the button would not immediately allow for usage of the screen. Rather, the methods 100, 200, 300, 600, 700 would need to first determine that the mobile communicator was moving at a speed lower than a threshold speed, that the mobile communicator is in a horizontal position and/or that the mobile communicator is in a horizontal position. In this way, the GPS may remain asleep and only become enabled when a user wishes to utilize the mobile communicator. In other embodiments, an image capture device may be activated in response to the activation button being pressed in order to determine if a user is attentive. This embodiment may bypass any need for GPS to activate in response to a user attempting to utilize the mobile communicator.

Elements of the embodiments have been introduced with either the articles "a" or "an." The articles are intended to mean that there are one or more of the elements. The terms "including" and "having" and their derivatives are intended to be inclusive such that there may be additional elements other than the elements listed. The conjunction "or" when used with a list of at least two terms is intended to mean any term or combination of terms. The terms "first" and "second" are used to distinguish elements and are not used to denote a particular order.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims. Moreover, it should be understood that the present invention may include any combination of the components, hierarchy and methodology described herein.

What is claimed is:

1. A mobile communicator comprising:
    a speed detection system for determining whether the mobile communicator is moving faster than a threshold speed;
    a user attentiveness detector configured to determine whether a user is attentive; a sensor element configured to determine orientation of the mobile communicator; and a circuit configured to disable a functionality of the mobile communicator is when the speed detection system determines that the mobile communicator is moving faster than the threshold speed and
    the sensor element determines that the mobile communicator is in a vertical position;
    wherein the circuit is configured to enable the functionality of the mobile communicator when the speed detection system determines that the mobile communicator is moving faster than the threshold speed and the sensor element determines that the mobile communicator is in a horizontal position and the user attentiveness detector determines that the user is attentive.

2. The mobile communicator of claim 1, wherein the mobile communicator includes a notification that displays a message informing a user to rotate the mobile communicator in a horizontal position to resume using the functionality.

3. The mobile communicator of claim 1, further comprising an override system that enables the functionality even if the circuit has placed the functionality in the turned off state.

4. The mobile communicator of claim 3, wherein the override system enables the functionality based on a second condition selected from the group consisting of biometrics, an accelerometer, motion detection, the time of day, a password, a voice command, and a wifi signal being present.

5. The mobile communicator of claim 1, wherein a wifi signal is configured to override the circuit and enable the functionality that has been otherwise turned off by the circuit.

6. The mobile communicator of claim 1, wherein the circuit is configured to ensure that the mobile communicator is in a turned off state when the speed detection system is unable to discern the speed of the mobile communicator.

7. The mobile communicator of claim 1, wherein the circuit is configured to retain the functionality in its most recent state if the speed detection system becomes unable to discern the speed of the mobile communicator.

8. A computer program product, comprising a non-transitory computer-readable storage medium having a computer-readable program code stored therein, said computer-readable program code containing instructions configured to be executed by a processor of a mobile communicator to implement a method of restricting the functionality of the mobile communicator, the method comprising:
    the processor determining whether the mobile communicator is moving faster than a threshold speed;
    the processor determining whether a user is attentive;
    the processor determining whether the mobile communicator is in a vertical position or a horizontal position;
    the processor disabling a functionality of the mobile communicator if the mobile communicator is moving faster than the threshold speed and the mobile communicator is in the vertical position; and
    the processor enabling the functionality of the mobile communicator if the mobile communicator is moving faster than the threshold speed and the mobile communicator is in the horizontal position and the user is attentive.

9. The computer program product of claim 8, the method further comprising the processor displaying a message informing a user to rotate the mobile communicator in a horizontal position to resume using the functionality.

10. The computer program product of claim 8, the method further comprising the processor enabling the functionality with an override system even if the circuit has placed the functionality in the turned off state.

11. The computer program product of claim 10, wherein the override system enables the functionality based on a second condition selected from the group consisting of biometrics, an accelerometer, motion detection, the time of day, a password, a voice command, and a wifi signal being present.

12. The computer program product of claim 8, wherein a wifi signal is configured to enable the functionality that has been otherwise turned off by the processor.

13. The computer program product of claim 8, the method further comprising the processor ensuring that the mobile communicator is in a turned off state when the speed detection system is unable to discern the speed of the mobile communicator.

14. The computer program product of claim 8, the method further comprising retaining the functionality in its most recent state if the speed detection system becomes unable to discern the speed of the mobile communicator.

15. A computer system comprising:
    a processor; and
    a computer-readable memory unit coupled to the processor, the memory unit containing instructions that when executed by the processor implement a method of restricting the functionality of the computer system, the method comprising:
    determining whether the mobile communicator is moving faster than a threshold speed;
    determining whether a user is attentive;
    determining whether the mobile communicator is in a vertical position or a horizontal position;
    disabling a functionality of the mobile communicator if the mobile communicator is moving faster than the threshold speed and the mobile communicator is in the vertical position; and
    enabling the functionality of the mobile communicator if the mobile communicator is moving faster than the threshold speed and the mobile communicator is in the horizontal position and the user is attentive.

16. The computer system of claim 15, the method further comprising the processor displaying a message informing a user to rotate the mobile communicator in a horizontal position to resume using the functionality.

17. The computer system of claim 15, the method further comprising the processor enabling the functionality with an override system even if the circuit has placed the functionality in the turned off state.

18. The computer system of claim 17, wherein the override system enables the functionality based on a second condition selected from the group consisting of biometrics, an accelerometer, motion detection, the time of day, a password, a voice command, and a wifi signal being present.

19. The computer system of claim 15, wherein a wifi signal is configured to enable the functionality that has been otherwise turned off by the processor.

20. The computer system of claim 15, the method further comprising the processor ensuring that the mobile communicator is in a turned off state when the speed detection system is unable to discern the speed of the mobile communicator.

21. The computer system of claim 15, the method further comprising retaining the functionality in its most recent state if the speed detection system becomes unable to discern the speed of the mobile communicator.

\* \* \* \* \*

UNITED STATES PATENT AND TRADEMARK OFFICE
CERTIFICATE OF CORRECTION

PATENT NO.        : 9,026,780 B2
APPLICATION NO.   : 13/914007
DATED             : May 5, 2015
INVENTOR(S)       : Robert C. Ewell, Jr. et al.

Page 1 of 1

It is certified that error appears in the above-identified patent and that said Letters Patent is hereby corrected as shown below:

In the Specification

At Column 17, Line 35, delete "wife" and insert -- wifi --

In the Claims

At Column 21, Line 19, delete "is" after the words "mobile communicator"

Signed and Sealed this
Seventeenth Day of November, 2015

Michelle K. Lee
*Director of the United States Patent and Trademark Office*